(12) United States Patent
Toyoda

(10) Patent No.: US 7,097,259 B2
(45) Date of Patent: Aug. 29, 2006

(54) WHEEL STRUCTURE AND WHEEL MOUNTING METHOD

(75) Inventor: Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 10/802,750

(22) Filed: Mar. 18, 2004

(65) Prior Publication Data

US 2004/0222693 A1    Nov. 11, 2004

(30) Foreign Application Priority Data

Mar. 19, 2003   (JP)   ............ 2003-074938

(51) Int. Cl.
*B60B 27/00* (2006.01)
*B60B 37/00* (2006.01)
*F16H 57/00* (2006.01)

(52) U.S. Cl. ............... 301/110.5; 301/6.91; 74/411

(58) Field of Classification Search ........... 301/105.1, 301/110.5, 110.6, 6.5, 6.91; 295/7; 180/371, 180/373; 74/411
See application file for complete search history.

(56) References Cited

U.S. PATENT DOCUMENTS

| | | | | |
|---|---|---|---|---|
| 1,874,192 A | * | 8/1932 | Kay ..................... | 301/35.54 |
| 4,424,981 A | * | 1/1984 | Maxwell, III ............. | 301/110.5 |
| 4,880,280 A | * | 11/1989 | Panzica et al. .......... | 301/110.5 |
| 5,757,084 A | * | 5/1998 | Wagner ................... | 301/105.1 |
| 5,992,943 A | * | 11/1999 | Sheets et al. ............ | 301/105.1 |
| 6,149,244 A | * | 11/2000 | Wagner ................... | 301/105.1 |
| 6,591,956 B1 | * | 7/2003 | Neugent .................. | 301/110.5 |

FOREIGN PATENT DOCUMENTS

| | | | | |
|---|---|---|---|---|
| JP | 1-309801 A | * | 12/1989 | ............. 301/105.1 |
| JP | 8-25363 B2 | | 3/1996 | |

* cited by examiner

*Primary Examiner*—Jason R. Bellinger
(74) *Attorney, Agent, or Firm*—Birch, Stewart, Kolasch & Birch, LLP

(57) ABSTRACT

A wheel structure wherein a hub includes both a hub body and a rubber support member which closes an opening of the hub body. A right bearing disposed on the hub body side and a left bearing disposed on the rubber support member side are rotatably mounted on an axle. An inner collar fitted on the axle is provided for maintaining a constant distance between the right and left bearings. The right bearing is brought into abutment against the rubber support member through a cylindrical outer collar which surrounds the inner collar. When the right bearing is press-fitted into the hub body hole, a press-fit load imposed on the right bearing can be borne by the rubber support member through the outer collar. The rigidity of the hub can be enhanced while preventing deformation. A higher load can be borne to act on the hub during vehicular operation.

14 Claims, 27 Drawing Sheets

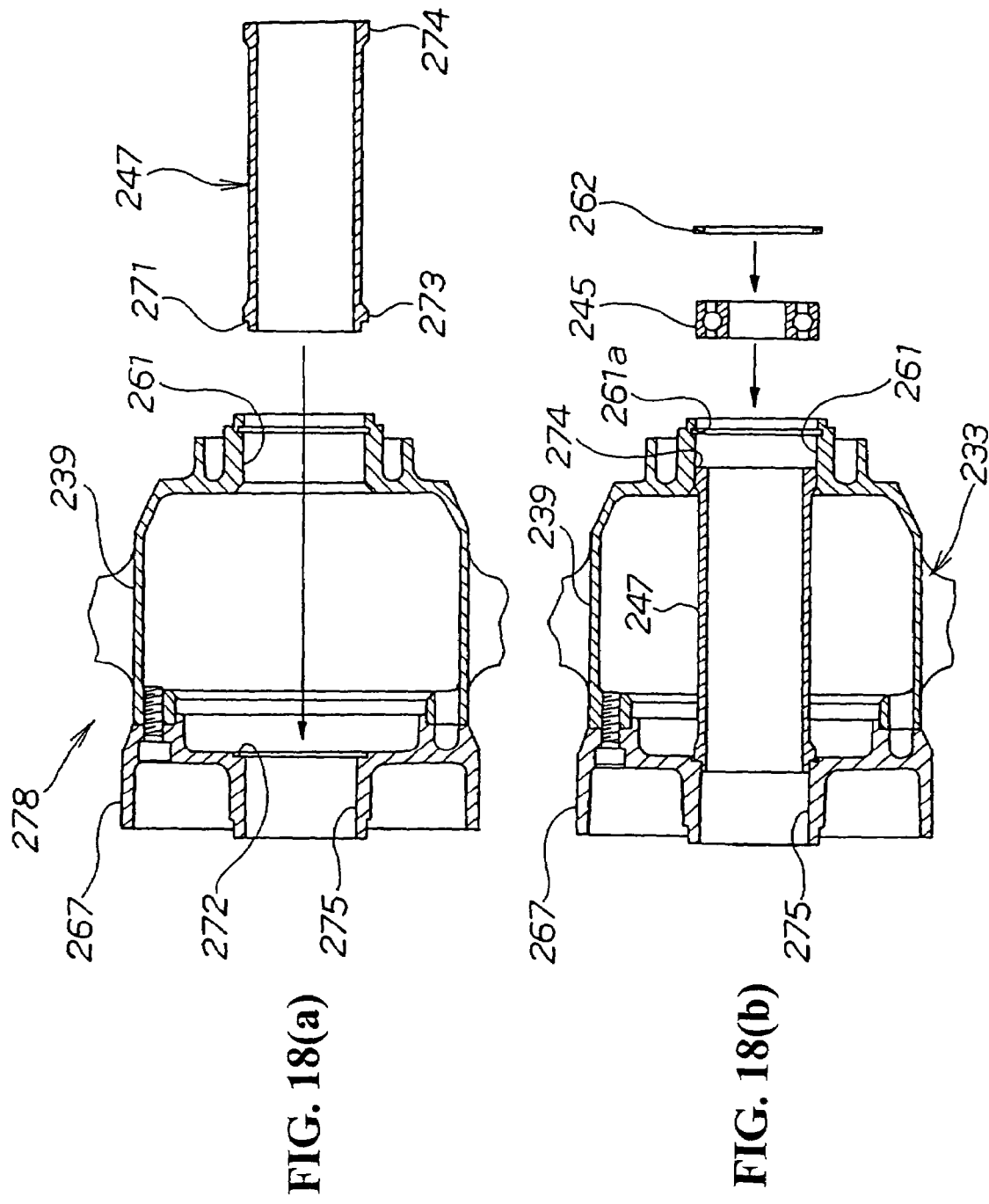

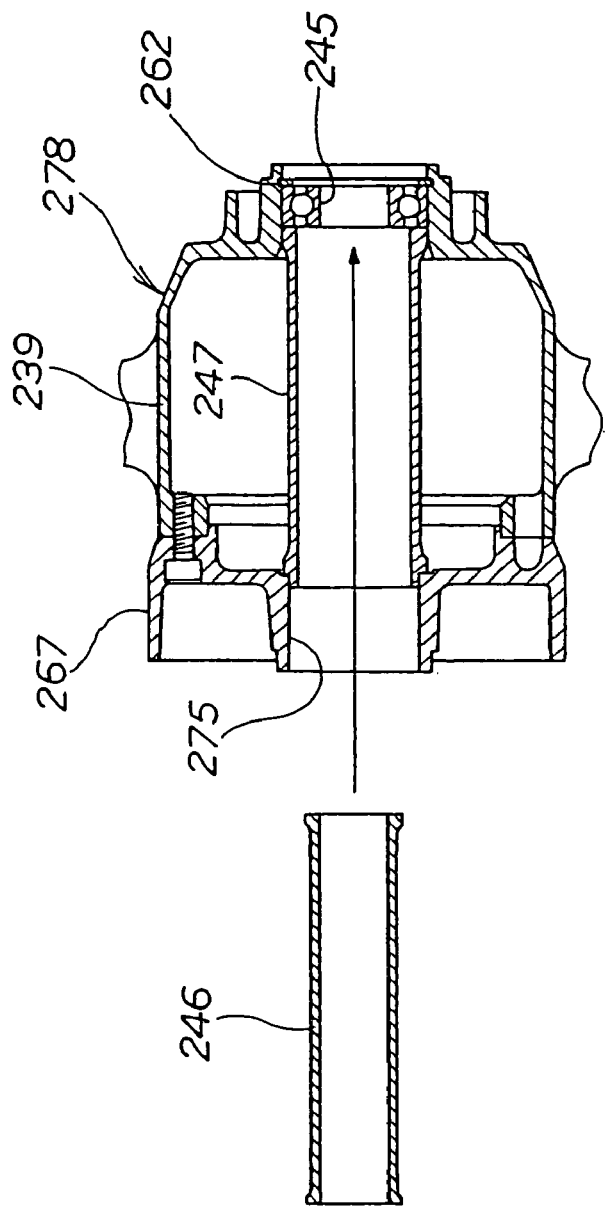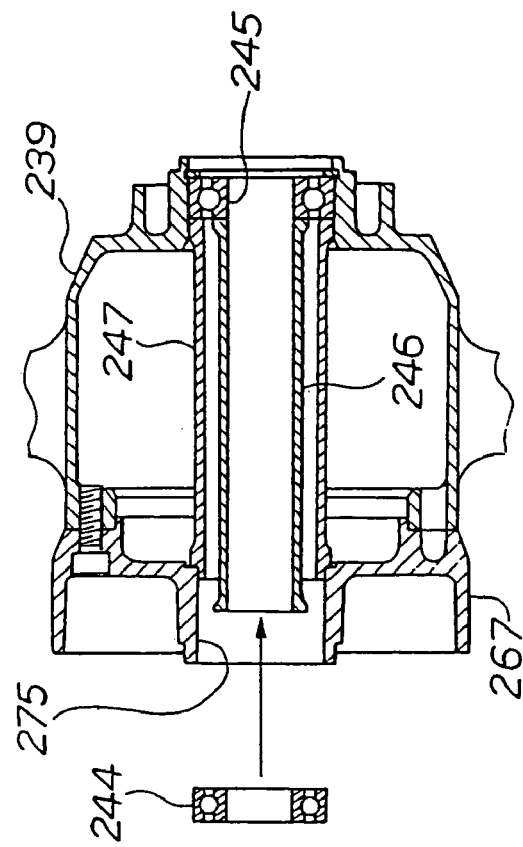
FIG. 19(a)
FIG. 19(b)

WHEEL STRUCTURE AND WHEEL MOUNTING METHOD

CROSS-REFERENCE TO RELATED APPLICATIONS

The present application claims priority under 35 USC 119 to Japanese Patent Application No. 2003-074938 filed on Mar. 19, 2003 the entire contents thereof is hereby incorporated by reference.

BACKGROUND OF THE INVENTION

1. Field of the Invention

The present invention relates to a wheel structure and a wheel mounting method in a motorcycle.

2. Description of Background Art

A wheel structure for a rear wheel for a motorcycle is known wherein a driven sprocket and a hub are disposed in a relatively rotatable manner with a wheel damper disposed between the driven sprocket and the hub to prevent propagation of a shock from the driven sprocket side to the hub side as disclosed in Japanese Patent Publication No. Hei 8-25363, pages 2 and 3, FIG. 3.

FIG. 3 in Japanese Patent Publication No. Hei 8-25363 will now be described with reference to FIG. 26 attached to the present application, in which reference numerals have been newly assigned. FIG. 26 is a sectional view showing a conventional wheel structure.

According to this conventional wheel structure, a collar 402 is fitted on an axle 401. A hub 407 of a rear wheel 406 is secured to the collar 402 rotatably through bearings 403 and 404 with a cover 408 attached to one end portion of the hub 407 with a bolt 411. A driven sprocket 413 is connected to the cover 408 through a buffer mechanism 412. A base portion 415 of a large diameter is formed centrally of the collar 402. Extending portions 416 and 417 are provided that are of a small diameter and are formed on both sides of the base portion 415 of the collar 402. A rear fork 418 is provided for supporting both ends of the axle 401.

Now, with reference to FIG. 27, a description will be given below of a method for mounting the rear wheel constructed as above.

FIG. 27 is an operation diagram showing a conventional wheel mounting method for mounting the rear wheel. The first the hub 407 and the cover 408 are connected together with bolt 411. One bearing 404 is press-fitted into a bearing hole 421 formed in the cover 408. The extending portion 417 of the collar 402 is fitted through the bearing 404.

As indicated by the arrows, the other bearing 403 is press-fitted into a bearing hole 422 formed in an end portion of the hub 407 with an inner surface of the bearing 403 being fitted on the extending portion 416 of the collar 402.

In FIG. 27, a predetermined press-fit load is needed for press-fitting the bearing 403 into the bearing hole 422. This load is imposed on the other bearing 403 through the collar 402. If the press-fit load on the bearing 403 is equal to that on the bearing 404, it becomes difficult for the bearing 404 to bear the press-fit load when the bearing 403 is press-fitted into the bearing hole 422. Therefore it has been desired to take a special measure for bearing the press-fit load.

The hub 407 is required not only to have rigidity against the press-fit load on the bearing 403 but also to be rigid enough against a load imposed thereon during vehicular operation.

For enhancing the rigidity of the hub 407, it may be effective to adopt, for example, a method of increasing the wall thickness of the hub 407. According to this method, however, it is necessary to change the shape of a die used, which is not easy. In addition, a large increase in the cost results.

SUMMARY AND OBJECTS OF THE INVENTION

Accordingly, it is an object of the present invention to provide a wheel structure having a wheel formed with a hub with the hub being of a structure wherein an opening formed in one end of the hub is closed with a side wall member. The wheel structure is enhanced in rigidity so as to fully withstand a load acting during press-fit of a bearing and a load acting during vehicular operation, as well as a wheel mounting method which can enhance rigidity of the hub easily and which can prevent an increase in the cost.

For achieving the above object, there is provided a wheel structure wherein a hub of a wheel is constituted by both a cup-like hub body and a side wall member for closing an opening formed in the hub body. The hub is secured to an axle rotatably through a first bearing disposed on the hub body side and a second bearing disposed on the side wall member side. A cylindrical inner collar, for keeping the first and the second bearing spaced from each other, is fitted on the axle. The first bearing is connected to the side wall member through a cylindrical outer collar which surrounds the inner collar.

When the first bearing is press-fitted into a hub body hole, a press-fit load imposed on the first bearing can be borne by the side wall member through the outer collar. For example, in comparison with a conventional structure wherein an outer collar is not provided with most of the press-fit load on the bearing being borne by the hub, it is possible in the present invention to enhance the rigidity of the hub and hence possible to prevent deformation of the hub body.

Since the first bearing and the side wall member are connected together through the outer collar, the hub body and the side wall member are also connected together at a position close to the axle, so that the rigidity of the hub can be enhanced. Consequently, it is possible to bear a higher load acting on the hub during vehicular operation.

According to the present invention a wheel structure is provided wherein a hub of a wheel includes by both a cup-like hub body and a side wall member for closing an opening formed in the hub body, the hub being secured to an axle rotatably through a first bearing disposed on the hub body side and a second bearing disposed on the side wall member side, and a cylindrical inner collar for keeping the first and the second bearing spaced from each other is fitted on the axle. A cylindrical outer collar surrounds the inner collar and is connected bridgewise to both the hub body and the side wall member.

The outer collar is connected bridgewise between the hub body and the side wall member, so when the first or the second bearing is press-fitted into one of the hub body and the side wall member, a press-fit load imposed on the first or the second bearing can be borne by the other of the hub body and the side wall member through the outer collar. Consequently, it is possible to enhance the rigidity of the hub and prevent deformation of the hub body or the side wall member when the first or the second bearing is press-fitted therein. Further, it is also possible to bear a higher load acting on the hub during vehicular operation.

According to the present invention there is provided a method for mounting a wheel to an axle. The wheel includes a hub having a generally cup-like hub body and a side wall member for closing an opening formed in the hub body. The method includes the connecting of the side wall member to the hub body and the inserting of a cylindrical outer collar into the hub body through a hub body hole formed in a bottom of the hub body and abutting a tip of the outer collar against the side wall member. A first bearing is fitted into the hub body hole with a cylindrical inner collar inserted into the outer collar through a side wall hole formed centrally of the side wall member and abuts a tip of the inner collar against the first bearing. A second bearing is fitted into the side wall hole and abuts the second bearing against the inner collar. The axle is disposed so as to be fitted within the second bearing, the inner collar and the first bearing.

By inserting the outer collar into the hub body through the hub body hole, the outer collar can be mounted easily into the hub and the rigidity of the hub can be enhanced easily by the outer collar.

According to the present invention there is provided a method for mounting a wheel to an axle. The wheel includes a hub having a generally cup-like hub body and a side wall member for closing an opening formed in the hub body. The method includes the connecting of the hub body and the side wall member with each other while holding a cylindrical outer collar between the hub body and the side wall member. A first bearing is fitted into a hub body hole formed in a bottom of the hub body. A cylindrical inner collar is inserted into the outer collar through a side wall hole formed centrally of the side wall member and abuts a tip of the inner collar against a first bearing. A second bearing is fitted into the side wall hole and abuts the second bearing against the inner collar. The axle is disposed so as to be fitted within the second bearing, the inner collar and the first bearing.

The outer collar for reinforcing the hub can be mounted to the hub at the time of connecting the hub body and the side wall member with each other, whereby an increase in the number of assembling steps can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 18(a) and 18(b) are a second operation diagram showing how to assemble the wheel according to the present invention;

FIGS. 19(a) and 19(b) are a third operation diagram showing how to assemble the wheel according to the present invention;

DETAILED DESCRIPTION OF THE PREFERRED EMBODIMENTS

Embodiments of the present invention will be described hereinunder with reference to the accompanying drawings.

Figure 1:
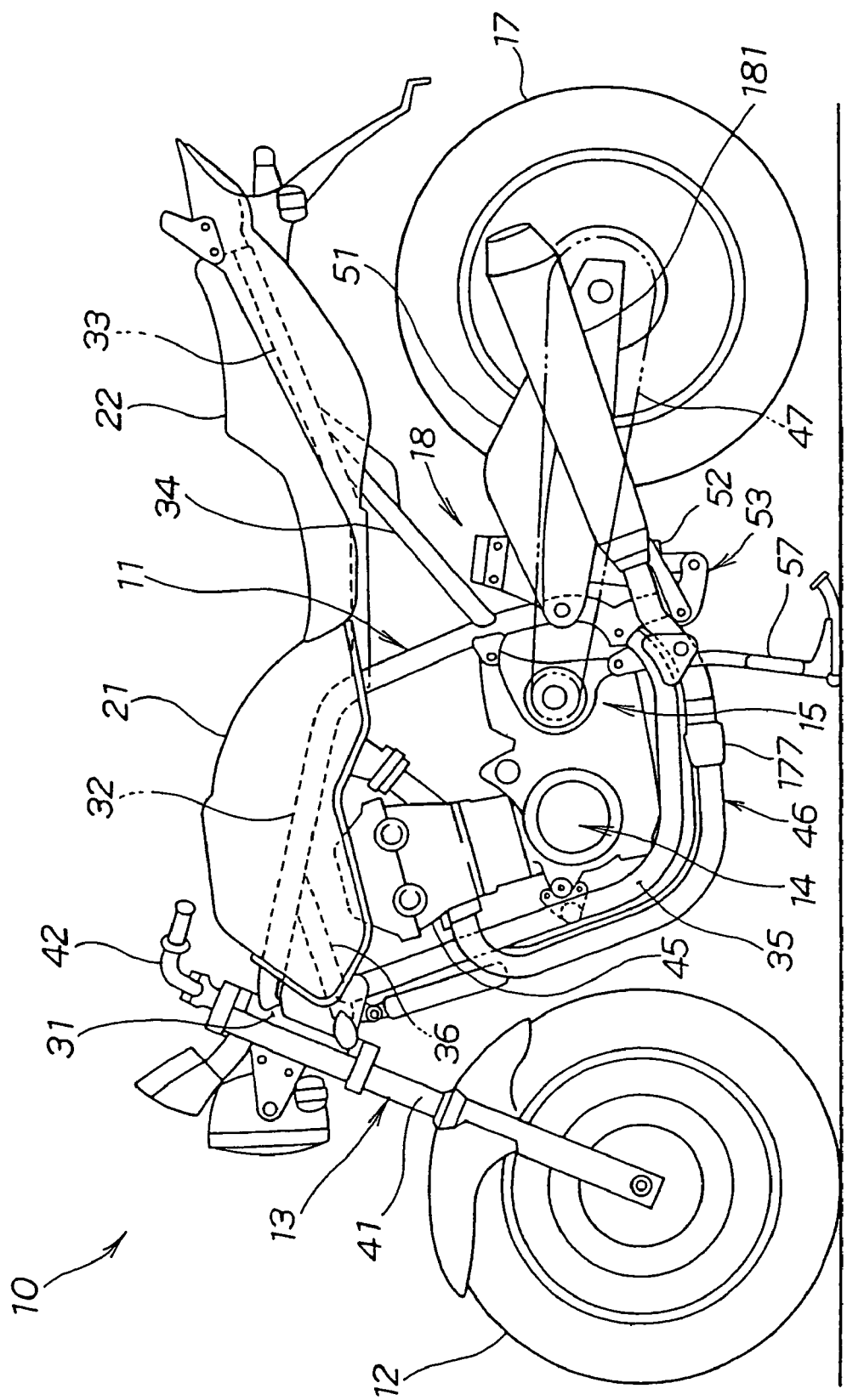
FIG. 1 is a side view of a motorcycle adopting a wheel structure according to the present invention.

FIG. 1 is a side view of a motorcycle equipped with a wheel structure according to the present invention. In FIG. 1, a motorcycle 10 includes a body frame 11 serving as a skeleton with a front wheel suspending/steering mechanism 13 attached to a front portion of the body frame 11 to suspend and steer a front wheel 12. A water-cooled engine 14 and a transmission 15 are both mounted nearly centrally of the body frame 11 with a rear suspension 18 attached to a rear lower portion of the body frame 11. A fuel tank 21 and a seat 22 are both attached to an upper portion of the body frame 11.

The body frame 11 includes a head pipe 31 disposed at a front end position, a pair of right and left main frames 32

(only the front-side reference number 32 is illustrated) extend rearwardly and obliquely downwardly from an upper portion of the head pipe 31. A pair of right and left seat rails 33 (only front-side reference numeral 33 is illustrated) extend rearwardly from nearly central portions of the main frames 33. A pair of sub-frames 34 (only front-side reference number 34 is illustrated) are connected bridgewise to both rear ends of the seat rails 33 and the main frames 32. Down frames 35 are provided with the down frames 35 extending rearwardly and obliquely downwardly from a lower portion of the head pipe and extending rearwardly and being connected to lower portions of the main frames 32 by a reinforcing frame 36.

The front wheel suspending/steering mechanism 13 includes a front fork 41 secured steerably to the head pipe 31, a bar handle 42 attached to an upper end of the front fork 41 and a front wheel 12 attached to a lower end of the front fork 41.

The engine 14 and the transmission 15 constitute an integral power unit, which is secured to the main frames 32 and the down frames 35.

In the engine 14, an exhaust device 46 extends rearwardly and backward from a cylinder head 45. The transmission 15 transmits power to a rear wheel 17 through a chain 47.

The rear suspension 18 includes a swing arm 51 attached swingably to a rear lower portion of a main frame 32, a rear shock absorber unit 52 with an upper end that is attached to a front upper portion of the swing arm 51 and a link mechanism 53 connected bridgewise to both a lower end of the rear shock absorber unit 52 and a lower end of a main frame 32.

An air cleaner (not shown) is disposed below and integrally with the fuel tank 21 which will be described in detail later. A main stand 57 is provided.

Figure 2:
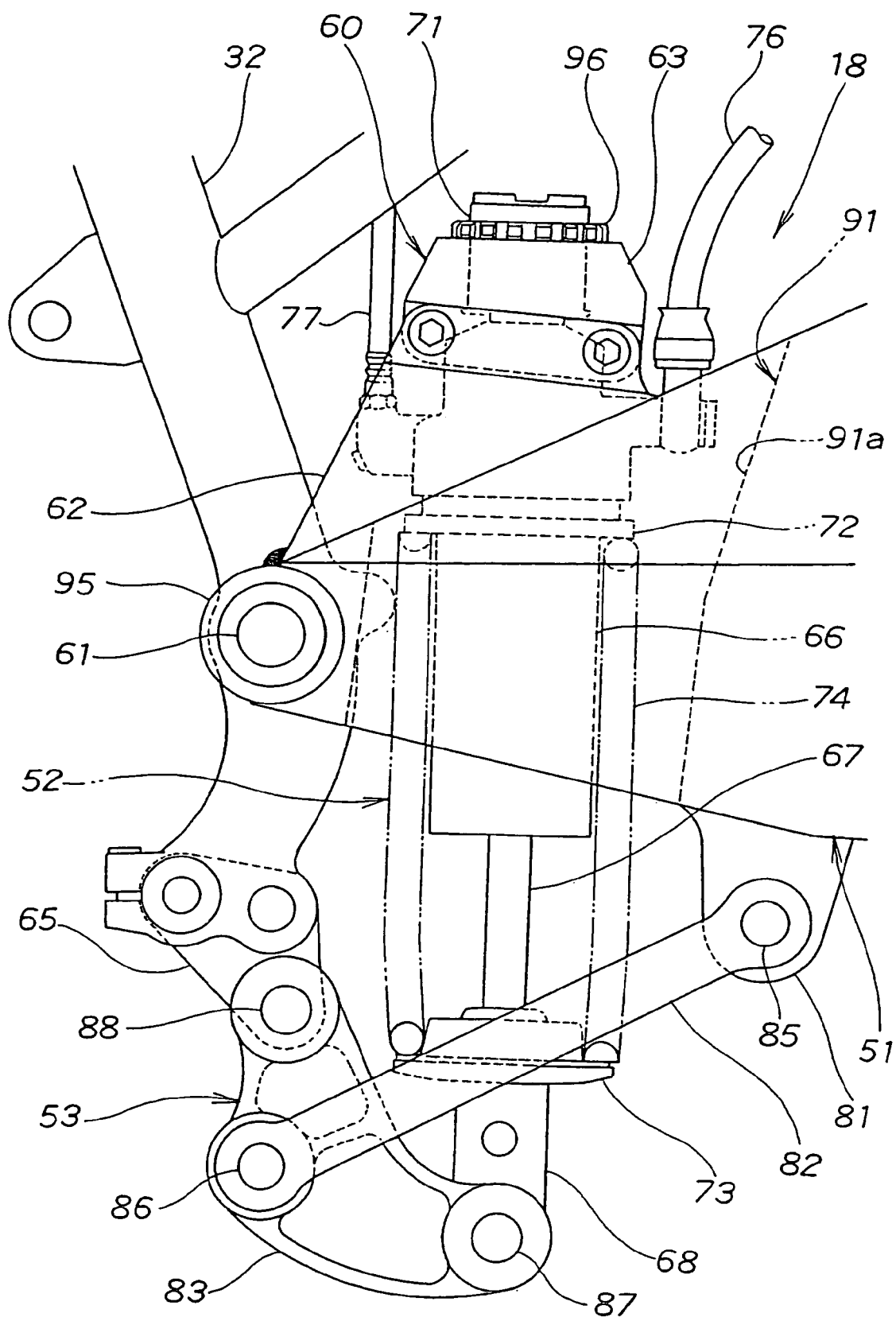
FIG. 2 is a side view of a principal portion of the motorcycle according to the present invention.

FIG. 2 is a side view of a principal portion of the motorcycle according to the present invention. In FIG. 2, the swing arm 51 is secured to a rear lower portion of a main frame 32 through a pivot shaft 61, right and left upright walls 62 (only one side reference 62 is shown) are formed on an upper portion of the swing arm 51. A shock absorber bracket 63 is connected bridgewise as a cross member to both upright walls 62. An upper end portion of the rear shock absorber unit 52 is attached to the rear shock absorber bracket 63, while a lower end portion of the rear shock absorber unit 52 is attached to a lower end side of the main frame 32. A connecting member 65 is provided for connecting the link mechanism 53 to a lower end of the main frame 32.

The upright walls 62 and the shock absorber bracket 63 constitute an upper end support member 60 which supports the rear shock absorber unit 52.

The rear shock absorber unit 52 includes a cylinder 66 which movably houses therein a piston (not shown) with a piston rod 67 is secured at one end thereof to the piston and extends to the exterior of the cylinder 66. A lower end mounting member 68 is provided at an opposite end of the piston rod 67 with an upper end mounting member 71 provided at an upper end of the cylinder 66. A suspension spring 74 is interposed between an upper spring seat 72 disposed outside the cylinder 66 and a lower spring seat 73 secured to the lower end mounting member 68. A reservoir tank (not shown, the details thereof will be described later) is connected to an upper portion of the cylinder 66 through a reservoir tank connecting hose 76. The upper end mounting member 71 is secured to the shock absorber bracket 63. The lower end mounting member 68 is connected to the link mechanism 53.

The rear shock absorber unit 52 has the following function.

When the swing arm 51 swings downwardly and the piston rod 67 enters an oil chamber formed within the cylinder 66, an internal volume of the oil chamber decreases, so that the oil present in the oil chamber is conducted to the reservoir tank as another oil chamber and is stored therein. On the other hand, when the swing arm 51 swings upwardly and the piston rod 67 retracts to the exterior from the oil chamber formed within the cylinder 66, the internal volume of the oil chamber increases, so that the oil stored in the reservoir tank is returned to the oil chamber in the cylinder 66.

Further, a preload adjusting mechanism (not shown, the details thereof will be described later) is attached to the rear shock absorber unit 52. According to the preload adjusting mechanism, a preload on the suspension spring 74 is adjusted by operating a preload operating unit (not shown, the details thereof will be described later). The preload operating unit is connected to the upper portion of the cylinder 66 through a spring preload adjusting hydraulic tube 77 (hereinafter referred to simply as the "preload adjusting tube 77").

The link mechanism 53 includes a first link 82 connected at one end thereof to a lower mounting portion 81 which is provided at a lower portion of the swing arm 51, and a second link 83 connected to an opposite end of the first link 82. The second link 83 is further connected at one end thereof to the lower end mounting portion 68 of the rear shock absorber unit 52 and at an opposite end thereof to the connecting member 65 disposed on the main frame 32 side. Connecting pins 85, 86, 87 and 88 are provided for securing the various members relative to each other.

Figure 3:
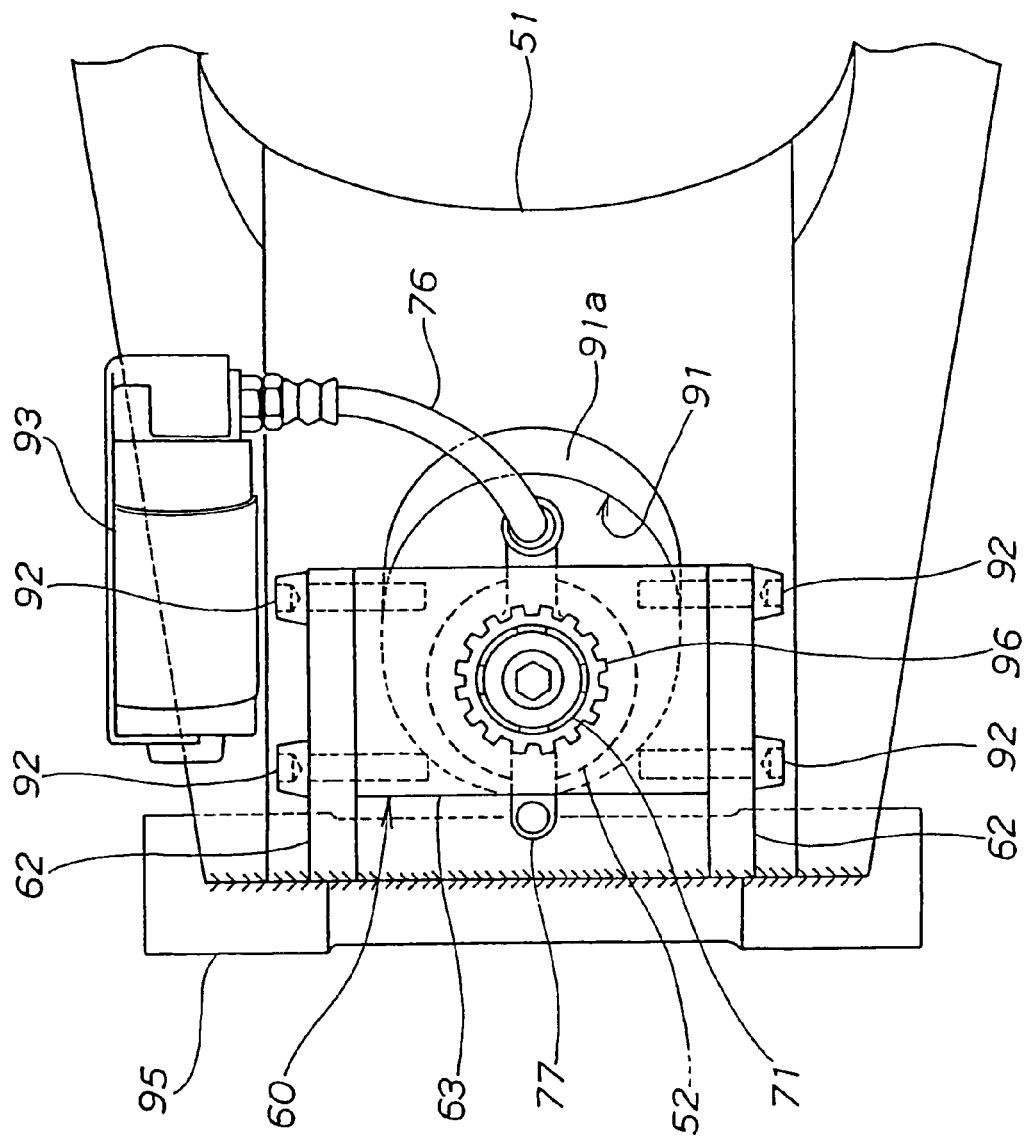
FIG. 3 is a plan view of a principal portion of the motorcycle according to the present invention.

FIG. 3 is a plan view of a principal portion of the motorcycle according to the present invention. In FIG. 3, an elongated through hole 91 is formed in the front portion of the swing arm 51 longitudinally of the vehicle body with upright walls 62 that are formed at upper positions on both right and left sides of the through hole 91. The shock absorber bracket 63 is connected bridgewise between the upright walls 62 and is secured thereto with bolts 92 ... (the dots ... represents a plurality of items). The upper end mounting member 71 of the rear shock absorber unit 52 is swingably attached to the shock absorber bracket 63 with a reservoir tank connecting hose 76 extending upwardly from behind the shock absorber bracket 63 and being connected to a reservoir tank 93 which is mounted at an upper position of a front side portion of the swing arm 51. The preload adjusting tube 77 extends upwardly in front of the shock absorber bracket 63. A mounting pipe 95 serves as a pivot portion and is secured to a front end of the swing arm 51. A nut 96 is provided for fixing the upper end mounting member 71 to the shock absorber bracket 63.

As shown FIG. 3, since the shock absorber bracket 63 is secured to the upright walls 62 sideways with bolts 92 ..., it is possible to improve the assembling work efficiency.

Referring back to FIG. 2, the through hole 91 has an upwardly tapered portion 91a. With the tapered portion 91a, a connecting portion of the cylinder 66 for connection with the reservoir tank connecting hose 76 can be ensured to be prevented from interference with an inner surface of the through hole 91. Moreover, since the tapered portion 91a is formed at only the upper portion of the through hole 91, the whole of the through hole 91 does not become larger in diameter and it is possible to easily ensure the rigidity of the swing arm 51.

A conductor is provided for outputting a signal from a stroke sensor attached to the rear shock absorber unit 52 that may be connected to the upper end portion of the rear shock absorber unit 52.

Figure 4:
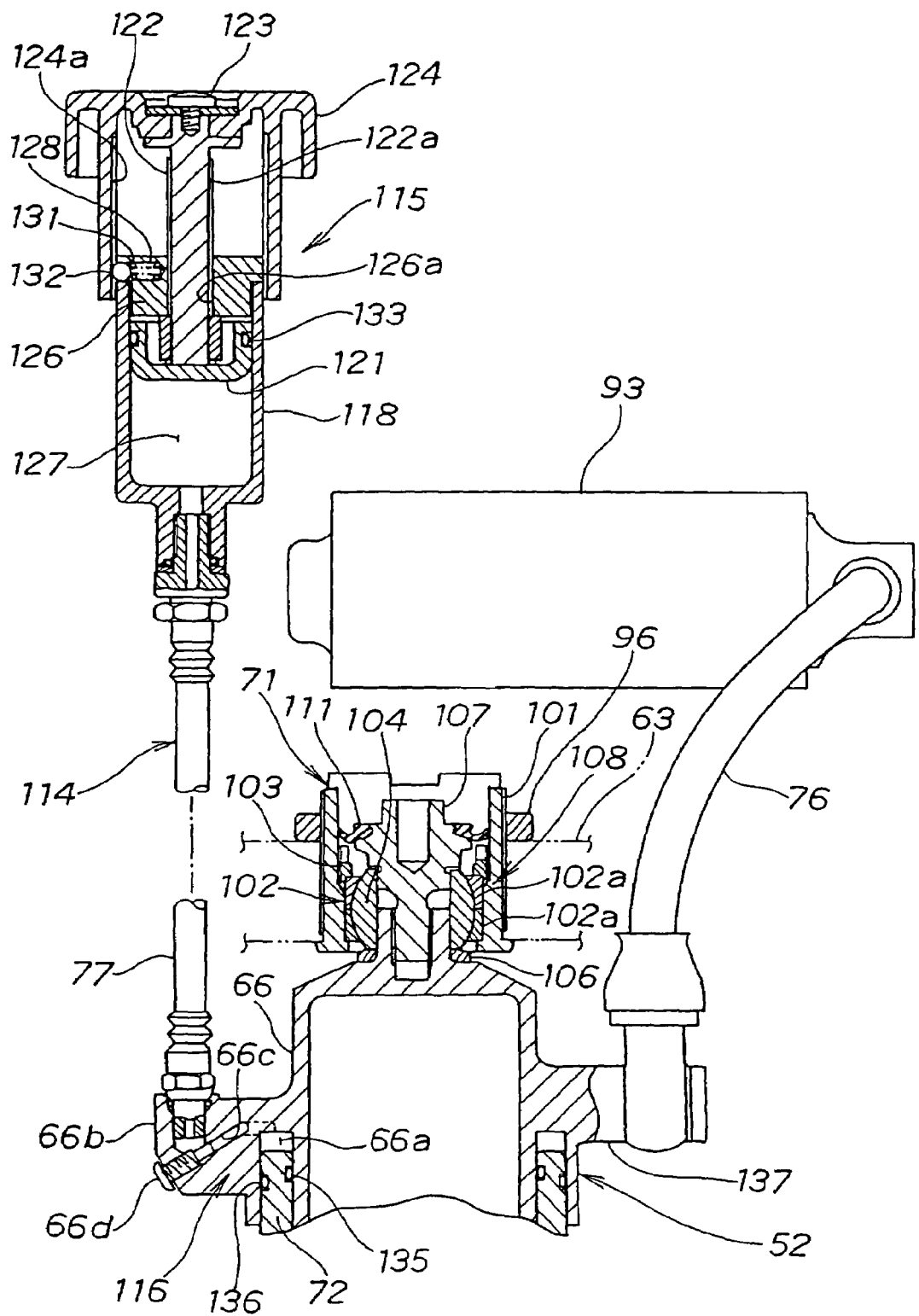
FIG. 4 is a sectional view showing an upper portion of a rear shock absorber unit and a preload adjusting mechanism in the motorcycle according to the present invention.

FIG. 4 is a sectional view showing the upper portion of the rear shock absorber unit and the preload adjusting mechanism in the motorcycle according to the present invention. The upper end mounting member 71 of the rear shock absorber unit 52 includes a cylindrical case 101 screwed to the shock absorber bracket 63. An outer ring 102 is received within the case 101 with an outer ring fixing nut 103 which is screwed to an inner surface of the case 101 for fixing the outer ring within the case 101. An inner ring 104 is adapted to slide on an inner surface of the outer ring 102 with an inner ring fixing bolt 107 for fixing the inner ring 104 to an end portion of the cylinder 66 through a spacer 106.

The outer ring 102 is formed by forming an inner surface of a cylindrical member as a part of a concave spherical surface and by making outer ring halves 102a of the same shape contiguous to each other. The inner ring 104 is formed by forming an outer surface of a cylindrical member as a part of a convex spherical surface.

The outer ring 102 and the inner ring 104 constitute a spherical plain bearing 108. A dust seal 111 is provided for preventing the adhesion of dust, etc. to a slide portion between the outer ring 102 and the inner ring 104.

The preload adjusting mechanism 114 includes a preload operating unit 115 and an operating unit 116 which is connected to the preload operating unit 115 through the preload adjusting tube 77. The preload adjusting mechanism 114 adjusts the load on the suspension spring 74 to provided a preload on the suspension spring 74 (see FIG. 2) i.e. the overall length of the rear shock absorber unit 52 (see FIG. 2) (mounting lengths of both upper end mounting portion 71 and lower end mounting portion 68 in FIG. 2). In other words, the preload adjusting mechanism 114 is used to adjust the mounting length of the suspension spring 74 relative to the rear shock absorber unit 52.

For example, when the number of passengers on the motorcycle 10 (see FIG. 1) increases from one to two, a preload is increased to prevent depression of the vehicle body.

The preload operating unit 115 includes a cylinder portion 118, a piston 121 movably received within the cylinder portion 118 with a bolt member 122 rotatably attached at one end thereof to the piston 121. An adjusting knob 124 is secured to an opposite end of the bolt member 122 with a screw 123. An end sealing member 126 is screwed to the cylinder portion 118 and the bolt member 122 to close an opening of the cylinder portion 118. An oil chamber 127 is provided to define by both cylinder portion 118 and piston 121.

The end sealing member 126 has a hole 128 formed in a side face thereof A spring 131 and a ball 132 are received within the hole 128. The adjusting knob 124 is rotated stepwise relative to the cylinder portion 118 side by pushing the ball 132 against concave portions 124a . . . by means of the spring 131. That is, a click feeling is created during rotation of the adjusting knob 124. An O-ring 133 is provided on the piston 121.

The operating unit 116 includes an oil chamber 66a formed between the upper spring seat 72 and the cylinder 66. The upper spring seat 72 is mounted to the cylinder 66 and is axially movable relative thereto. An oil path 66c is formed in a first side projection 66b of the cylinder 66 so as to communicate with the oil chamber 66a. A throttle valve 66d throttles the oil path 66c. O-rings 135 and 136 are provided together with a second side projection 137 which projects sideways from the cylinder 66 for connecting the reservoir tank connecting hose 76 to the upper end portion of the cylinder 66.

The operation of the preload adjusting mechanism 114 as constructed above will be described below.

When the adjusting knob 124 is turned by hand, the bolt member 122 rotates together with the adjusting knob 124 and the piston 121 moves down from its illustrated position by a threaded engagement between a male screw 122a formed in the bolt member 122. A female screw 126a is formed in the end sealing member 126.

Consequently, the oil filled within the oil chamber 127 in the cylinder 118 passes through the preload adjusting tube 77 and further through the oil path 66c to reach the oil chamber 66a to increase the internal volume of the oil chamber 66a.

As a result, the upper spring seat 72 moves downwardly with respect to the cylinder 66, whereby it is possible to shorten the mounting length of the suspension spring and increase the preload on the suspension spring.

Referring back to FIG. 4, if the adjusting knob 124 is turned in a direction opposite to the above direction, the piston 121 increases and the oil present within the oil chamber 66a and passes through the oil path 66c and the preload adjusting tube 77 and reaches the interior of the oil chamber 127 so that the internal volume of the oil chamber 66a decreases and the upper spring seat 72 moves upwardly relative to the cylinder 66. Thus, it is possible to increase the mounting length of the suspension spring and decrease the preload on the suspension spring.

Figure 5:
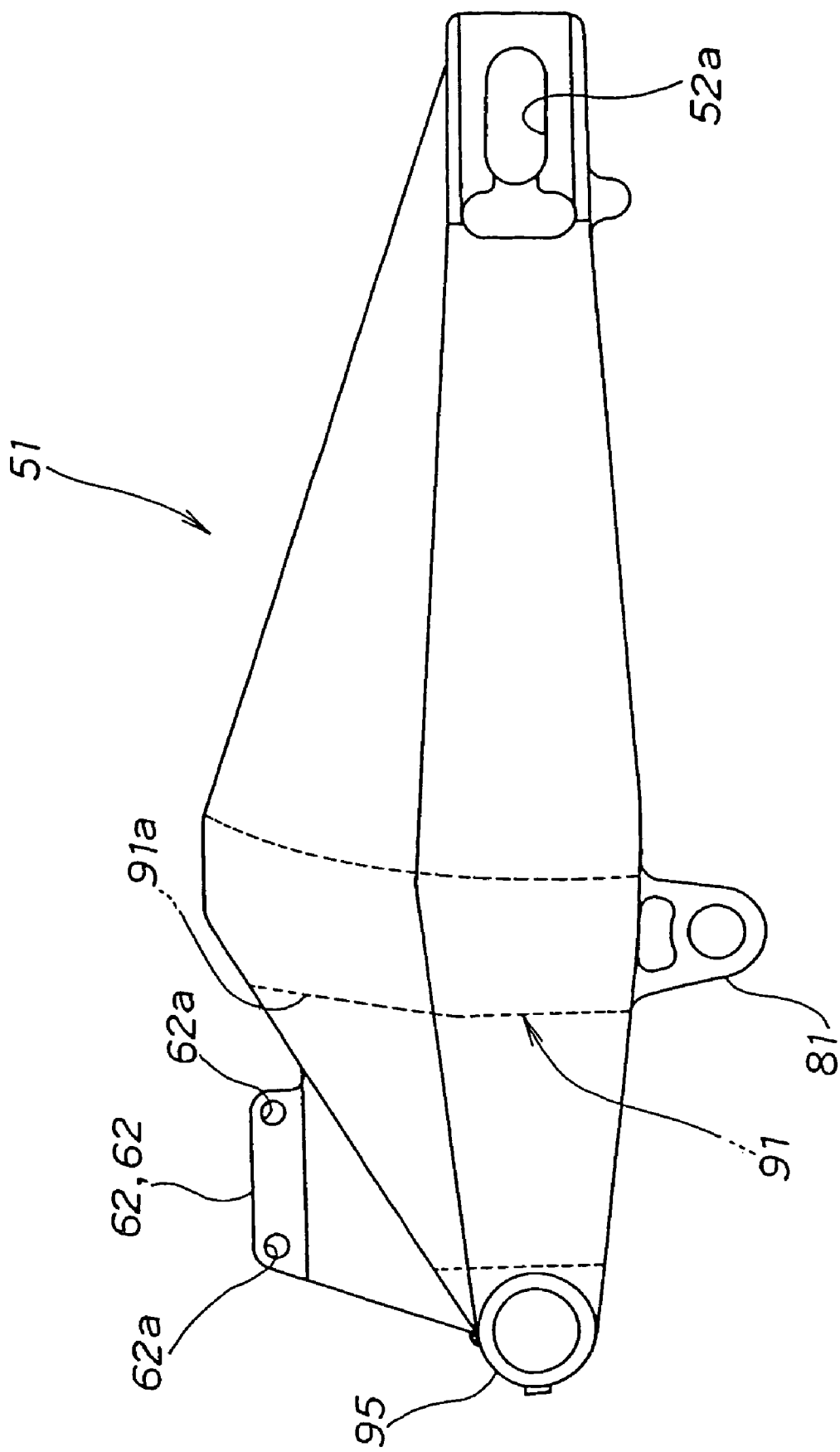
FIG. 5 is a side view of a swing arm in the motorcycle according to the present invention.

FIG. 5 is a side view of the swing arm used in the motorcycle according to the present invention. In the swing arm 51, as shown in FIG. 5, the mounting pipe 95 is attached to the front end with the upright walls 62 attached to a front upper portion including the mounting pipe 95. The lower mounting portion 81 is attached to a lower portion and an axle mounting hole 52a. An axle mounting portion is provided for mounting the axle of the rear wheel 17 (see FIG. 1) is formed in a rear end.

Two bolt inserting hole 62a are formed to let a pair of bolts 92 (see FIG. 3) pass therethrough for mounting the shock absorber bracket 63 (see FIG. 2) to the upright walls 62.

Figure 6:
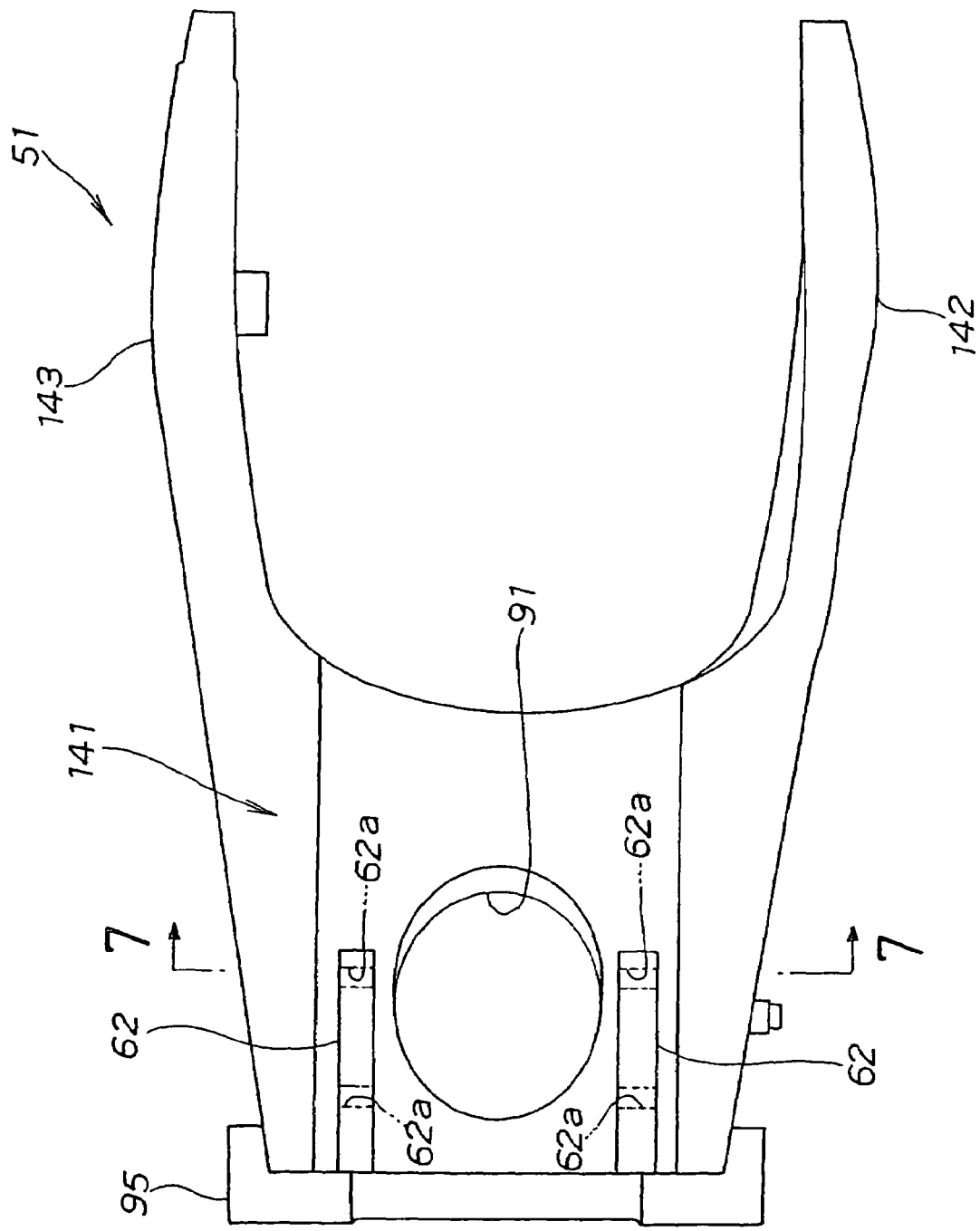
FIG. 6 is a plan view thereof according to the present invention.

FIG. 6 is a plan view of the swing arm used in the motorcycle according to the present invention. The swing arm 51 includes a base portion 141 formed on the front side and is in a generally trapezoidal shape when seen in plan. Left and right arm portions 142, 143 extend rearwardly and integrally from the base portion 141 and the mounting pipe 95. Upright walls 62 and the lower mounting portion 81 (see FIG. 5) are attached to the base portion 141 with the through hole 91 being formed in the base portion 141.

As shown in FIGS. 5 and 6, since the upright walls 62 are attached not only to the base portion 141 but also to the mounting pipe 95, it is possible to mount the upright walls 62 firmly and enhance the rigidity of the swing arm 51. Therefore, in case of obtaining a predetermined rigidity, it is possible to further reduce the weight of the swing arm 51.

Figure 7:
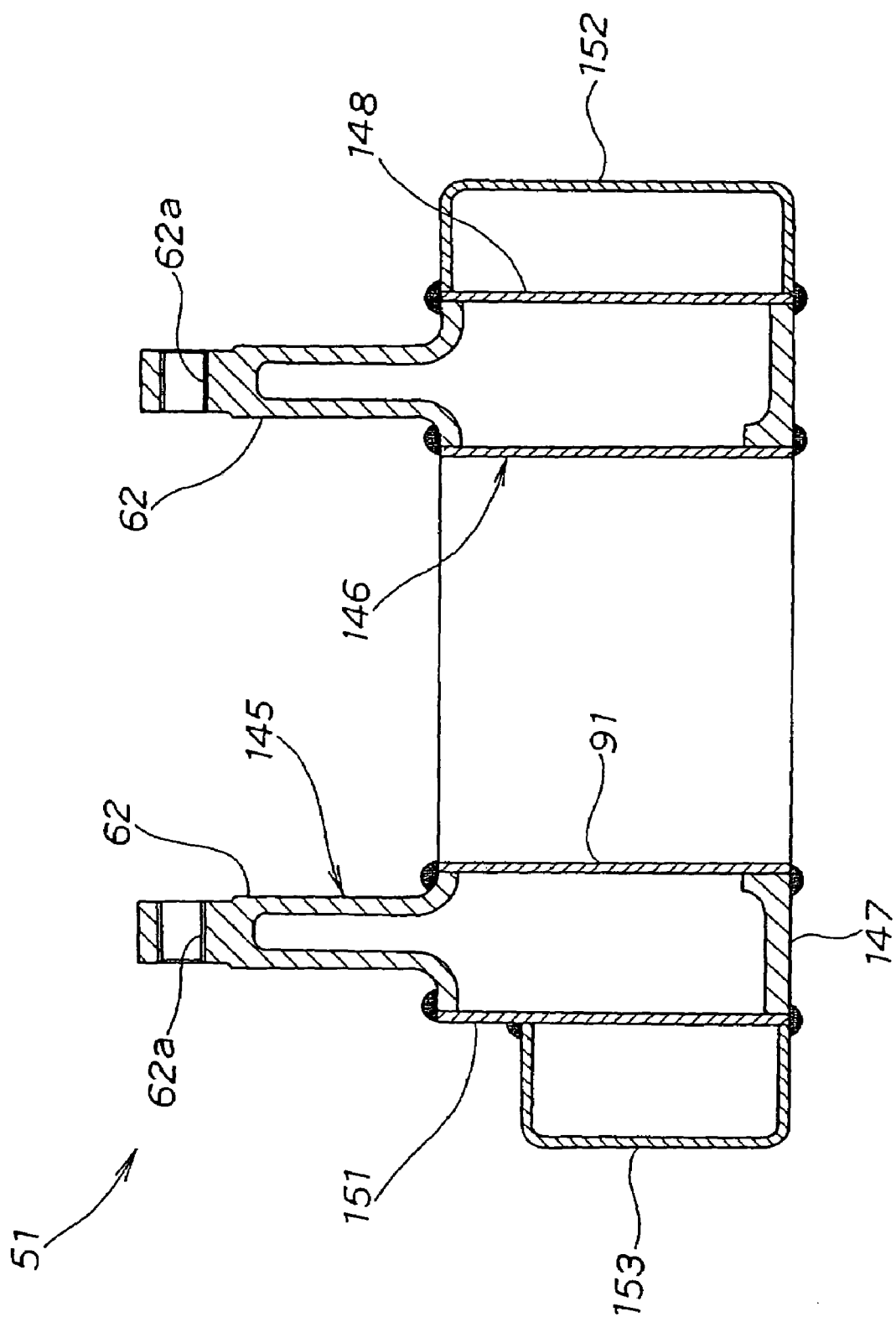
FIG. 7 is a sectional view taken on line 7—7 in FIG. 6.

FIG. 7 is a sectional view taken on line 7—7 in FIG. 6. In the swing arm 51, as shown in FIG. 7, an upper plate member 145 forms an upper surface which includes the upright walls 62 as integrally molded components. A cylindrical member 146 forms the through hole 91 with a lower plate member 147 that forms a lower surface. A left plate member 148 and a right plate member 151 form left and right side faces, respectively, of the upper plate member 145 and the lower plate member 147. A left turned U-shaped member 152 of a turned U-shaped section forms a quadrangular pipe conjointly with the left plate member 148 and a right turned U-shaped member 153 of a turned U-shaped section forms a quadrangular pipe conjointly with the right plate member 151. These components are welded together.

Figure 8:
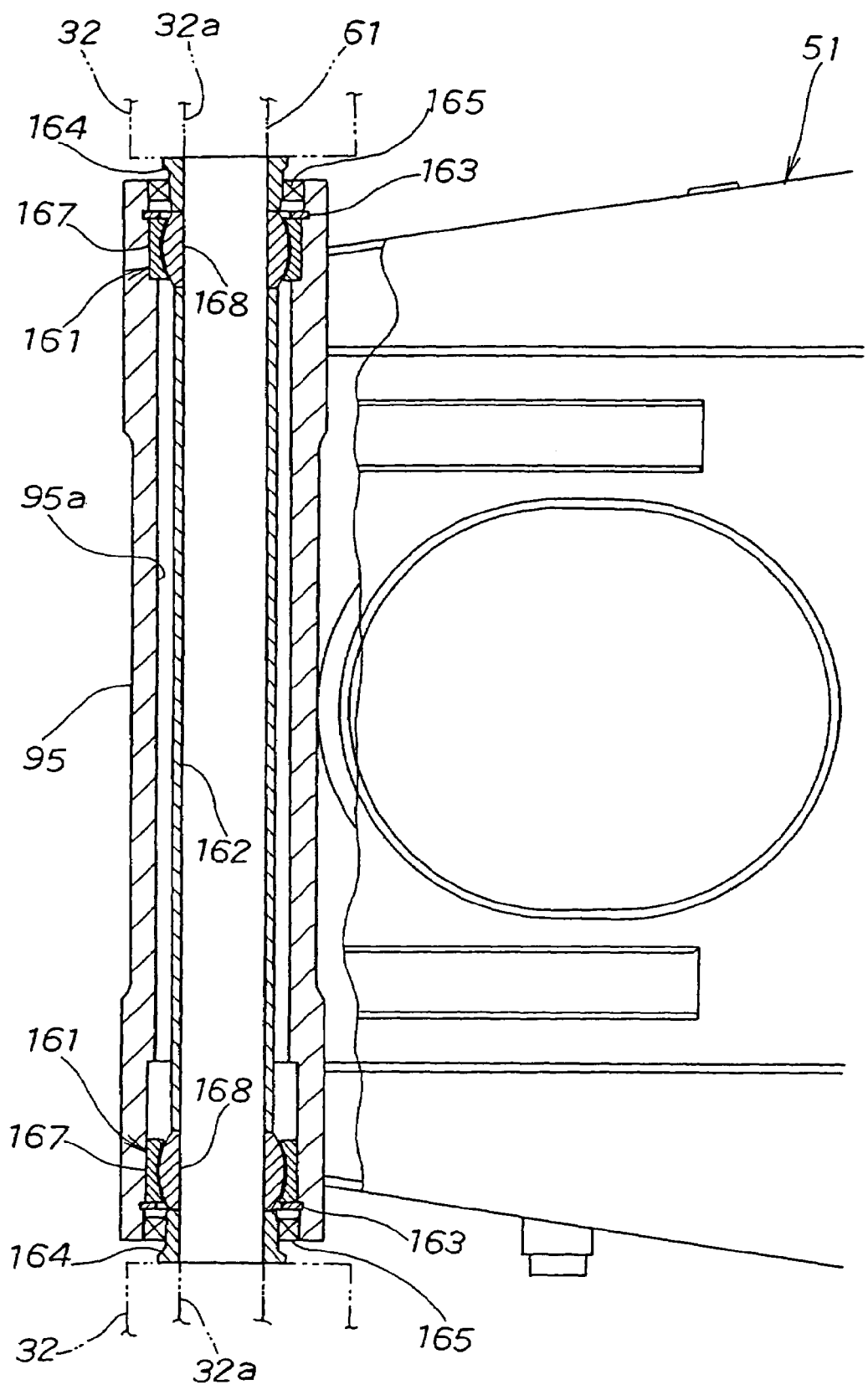
FIG. 8 is a sectional view (a plan view in part) showing a front end portion of the swing arm according to the present invention.

FIG. 8 is a sectional view (a plan view in part) showing the front end portion of the swing arm used in the motorcycle according to the present invention. In FIG. 8, a pair of spherical plain bearings 161 are inserted into both ends, respectively, of a hollow portion 95a of the mounting pipe 95. An inner pipe 162 is inserted into the hollow portion 95a to keep a constant distance between the spherical plain bearings 161. A pair of retaining rings 163 are used to prevent dislodgment of the spherical plain bearings 161 from the hollow portion 95a. A pair of collars 164 are disposed outside and adjacent to the spherical plain bearings 161. A pivot shaft 61 includes a bolt that is inserted into all of the spherical plain bearings 161, inner pipe 162, collars 164 and a pair of mounting holes 32a formed in the main frames 32. A nut is brought into threaded engagement with a male screw formed at a front end of the pivot shaft 61, thereby securing the swing arm 51 to both right and left main frames 32. A dust seals 165 is provided adjacent to both ends thereof.

Each of the spherical plain bearings 161 includes an outer ring 167 fitted in the mounting pipe 95 and an inner ring 168 with an outer surface that is slidably fitted in the outer ring 167 and an inner surface that is fitted on the pivot shaft 61.

Figure 9:
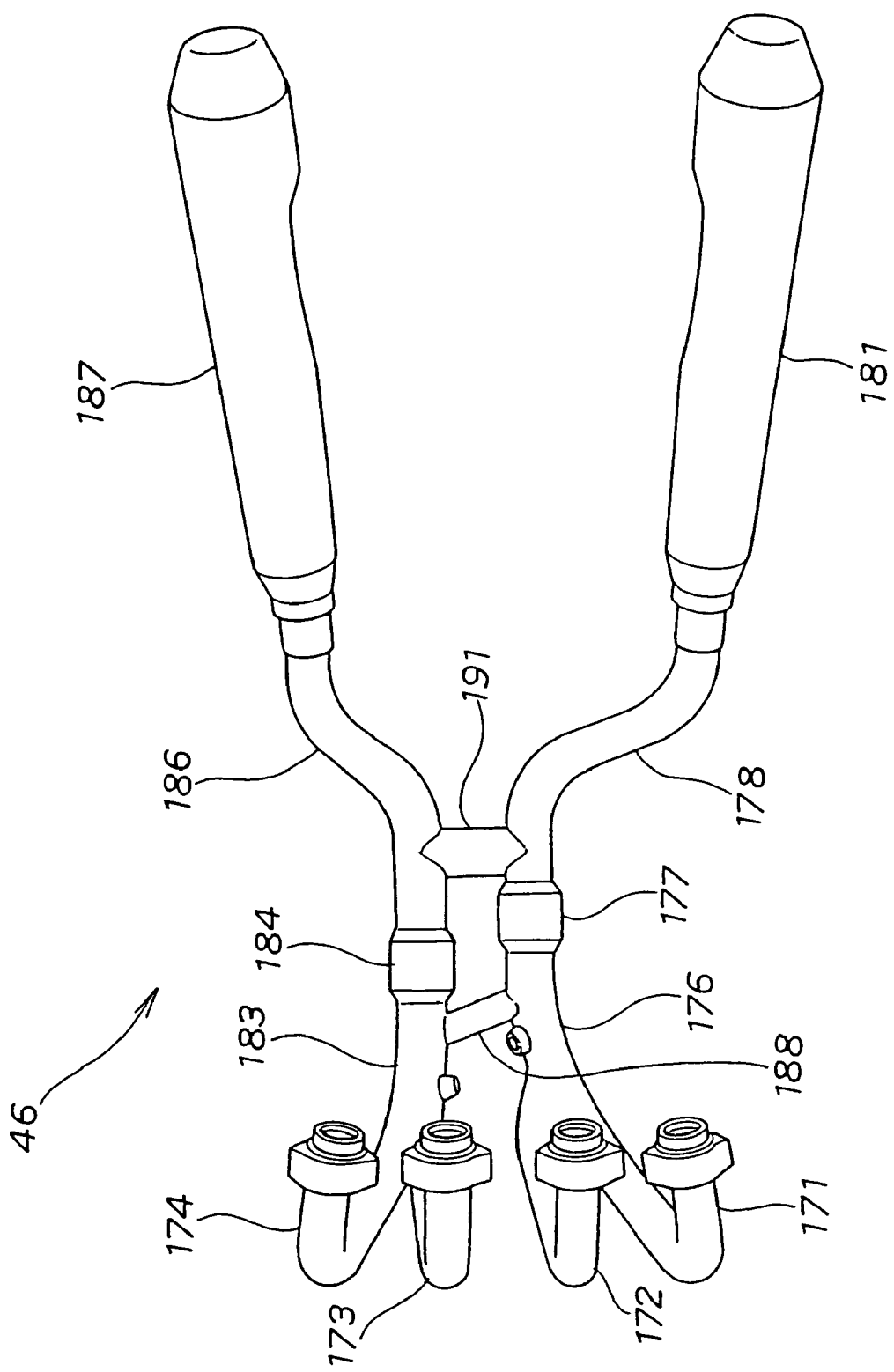
FIG. 9 is a plan view showing an exhaust device used in the motorcycle according to the present invention.

FIG. 9 is a plan view showing the exhaust device used in the motorcycle according to the present invention. As shown in FIG. 9, the exhaust device 46, is for a straight type four-cylinder engine and includes a first exhaust pipe 171, a second exhaust pipe 172, a third exhaust pipe 173 and a fourth exhaust pipe 174. The first to fourth exhaust pipes are mounted cylinder by cylinder to the cylinder head 45 (see FIG. 1). A left confluent pipe 176 is connected to the first and second exhaust pipes 171, 172 with a left catalyst mounting pipe 177 connected to a rear end of the left confluent pipe 176 and a left rear exhaust pipe 178 and a left rear exhaust pipe 178 connected to a rear end of the left catalyst mounting pipe 177. A left muffler 181 is connected to a rear end of the left rear exhaust pipe 178 with a right confluent pipe 183 connected to the third and fourth exhaust pipes 173, 174, a left catalyst mounting pipe 184 connected to a rear end of the right confluent pipe 183, a right rear exhaust pipe 186 connected to a rear end of the right catalyst mounting pipe 184 and a right muffler 187 connected to a rear end of the right rear exhaust pipe 186. A front communication pipe 188 is provided for providing communication between the left and right confluent pipes 176, 183. A rear communication pipe 191 is provided for providing communication between the left and right rear exhaust pipes 178, 186.

Figure 10:
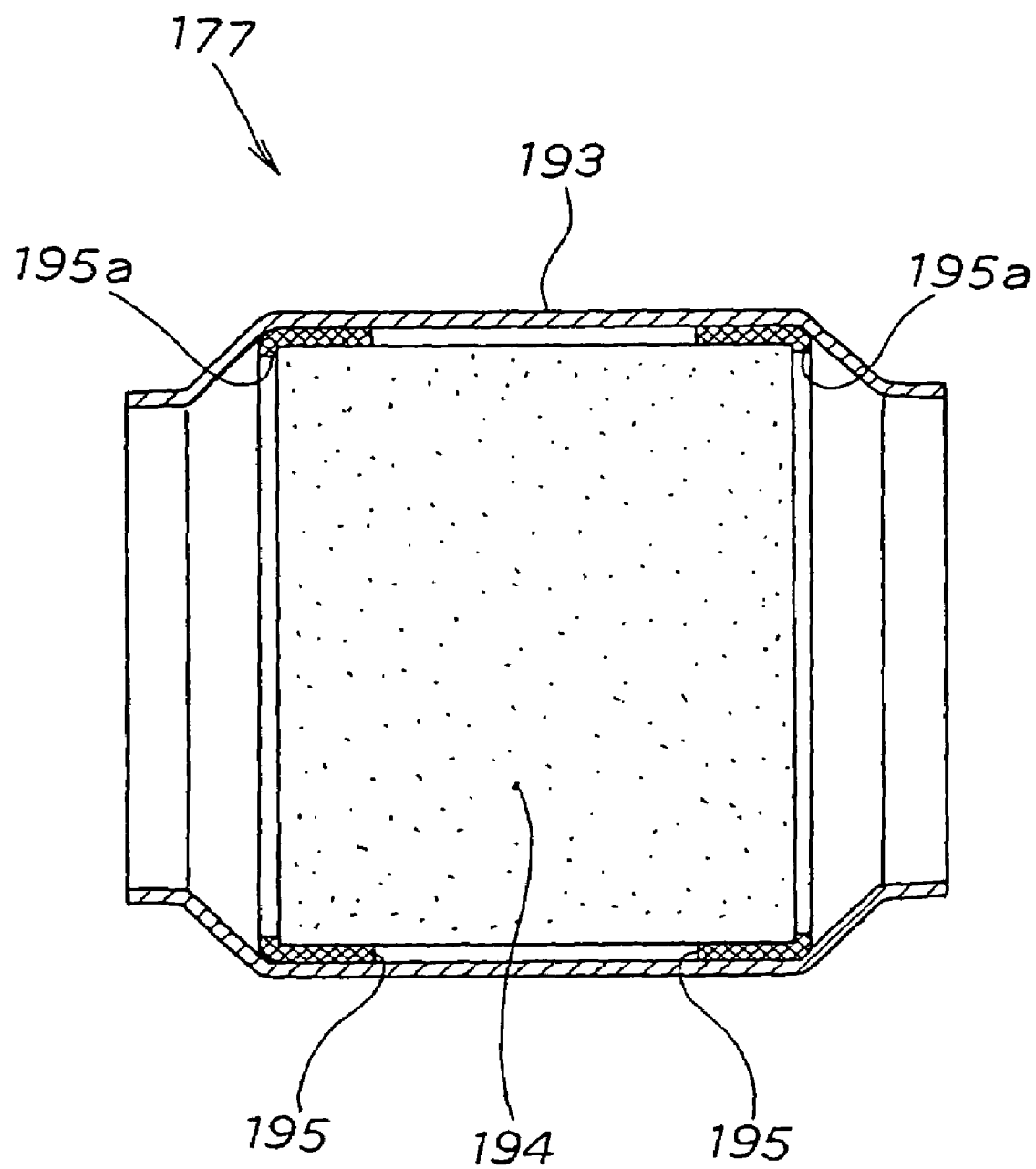
FIG. 10 is a sectional view of a catalyst mounting pipe used in the motorcycle according to the present invention.

FIG. 10 is a sectional view of a catalyst mounting pipe used in the motorcycle according to the present invention. A description will be given below of the left catalyst mounting pipe 177 shown in FIG. 9. As to the right catalyst mounting pipe 184, it is of the same structure as the left catalyst mounting pipe 177.

The left catalyst mounting pipe 177 includes a pipe portion 193, a catalyst 194 accommodated within the pipe portion 193, and a pair of annular spacers 195 disposed between the pipe portion 193 and the catalyst 194. Both ends of the pipe portion 193 are throttled to hold the catalyst 194 through the spacers 195. A stepped portion 195a is formed at an inner periphery end portion of each spacer 195 for abutment against end portions 194a of the catalyst 194.

Each spacer 195 is a generally cylindrical member formed by weaving a stainless steel wire that has elasticity. More specifically, when the catalyst 194 undergoes a thermal expansion or when the pipe portion 193 is throttled, an external force acting on the catalyst 194 is mitigated by the spacers 195 to hold the catalyst 194 elastically within the pipe portion 193.

The spacers 195 may be formed using ceramic fibers.

Figure 11:
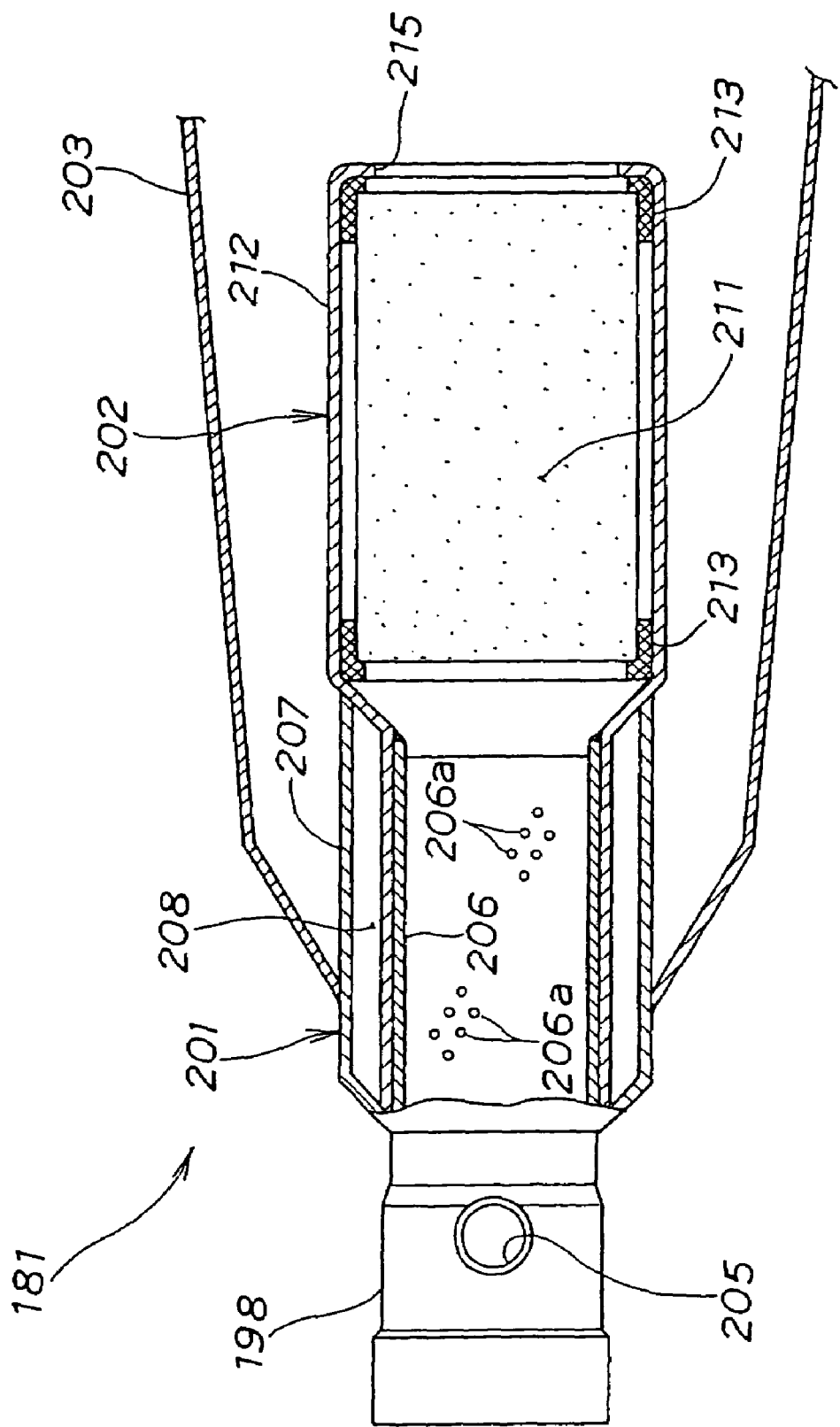
FIG. 11 is a sectional view showing a muffler used in the motorcycle according to the present invention.

FIG. 11 is a sectional view showing a muffler used in the motorcycle according to the present invention. A description will be given below of the left muffler 181 shown in FIG. 9. As to the right muffler 187, it is of the same structure as the left muffler 181.

The left muffler 181 includes an inlet pipe 198, an intermediate pipe 201 integral with a rear portion of the inlet pipe 198, a rear pipe 202 integral with a rear portion of the intermediate pipe 201, and an outer cylinder 203 connected to the intermediate pipe 201.

A valve mounting portion 205 is provided for rotatably mounting an exhaust valve (not shown) which is for adjusting an exhaust pressure. The valve mounting portion 205 is formed in the inlet pipe 198.

The intermediate pipe 201, which is a double pipe, includes an inner pipe 206 having vent holes 206a . . . and an outer pipe 207 disposed outside the inner pipe 206.

An annular chamber 208 is formed between the inner pipe 206 and the outer pipe 207 and is packed with stainless wool formed by fibrous stainless steel.

With the stainless wool, the temperature of exhaust gas which enters the annular chamber 208 from the inner pipe 206 through vent holes 206a . . . is retained to prevent a drop in temperature of the exhaust gas passing through the inner pipe 206.

The rear pipe 202, contains catalyst 211 and includes a pipe portion 212. The catalyst 211 includes spacers 213 disposed between the catalyst 211 and the pipe portion 212. The spacers 213 are of the same material and same structure as the spacers 195 shown in FIG. 10. By throttling the pipe portion 212, the catalyst 211 is held elastically through the spacers 213. A pipe outlet 215 is formed in a rear end of the pipe portion 212.

The exhaust gas which has been prevented from being lowered in temperature within the intermediate pipe 201 comes into contact with the catalyst 211 at a high temperature within the rear pipe 202, so that it is possible to accelerate a catalytic reaction.

The following description is now provided about how to assemble the left catalyst mounting pipe 177 constructed as above.

Figure 12:
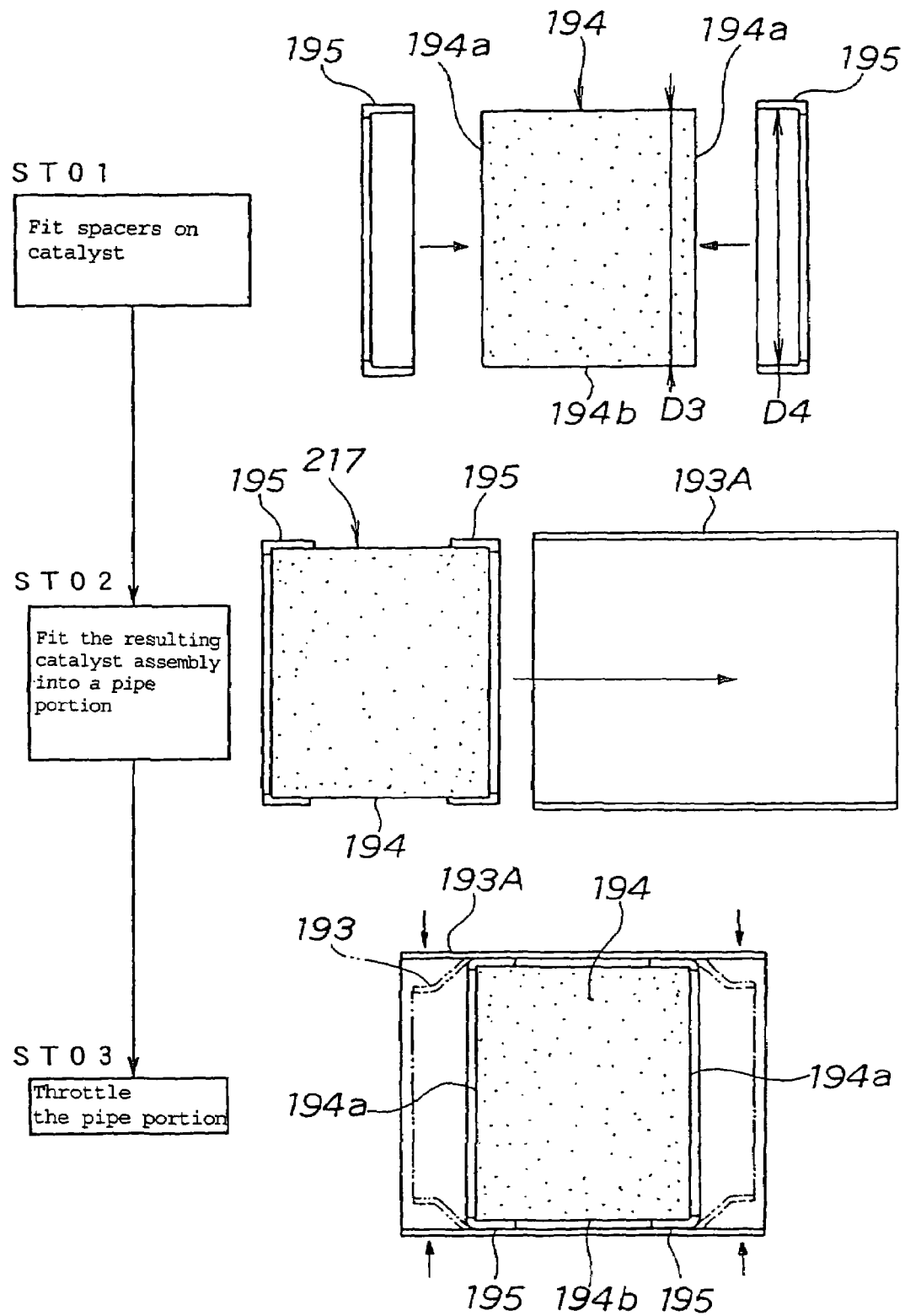
FIG. 12 is an operation diagram showing how to assemble the catalyst mounting pipe used in the motorcycle according to the present invention.

FIG. 12 is an operation diagram showing how to assemble a catalyst mounting pipe used in the motorcycle according to the present invention. An assembling flow will be described with respect to the left catalyst mounting pipe 177. STXX represents a step number.

ST01 . . . Spacers are fitted on the catalyst. More specifically, the spacers 195 are fitted on outer periphery portions 194b of the catalyst 194 from the end portions 194a side of the catalyst 194 which is columnar, to fabricate a catalyst assembly 217.

For the fitting, an inside diameter D4 of each spacer 195 is set smaller than an outside diameter D3 of the catalyst 194, whereby the spacers 195 are press-fitted on the catalyst 195 elastically. After the fitting, therefore, the spacers 195 are difficult to be disengaged from the catalyst 194 and it is easy to perform the next operation.

ST02 . . . The catalyst assembly is fitted into the pipe portion. More specifically, the catalyst assembly 217 is fabricated in ST01 and is inserted into a straight pipe portion 193A, followed by positioning.

In this case, the fitting is clearance fit or press-fit.

ST03 . . . The pipe portion is throttled. More specifically, both ends of the pipe portion 193A are throttled, allowing the catalyst 194 to be held elastically by the pipe portion 193 after the throttling.

Since the catalyst 194 is thus held elastically through the spacers 195, corners between the end portions 194a and the outer periphery portions 194b of the catalyst 194 can be prevented from being damaged during the throttling work and a thermal expansion of the catalyst 194 can be absorbed by the spacers 195. In addition, even in the event the catalyst 194 contracts at a low temperature, there is no fear of wobbling of the catalyst within the pipe portion 193. It is optional whether both ends of the pipe portion 193A are to be throttled in an alternate manner or at the same time. If both ends are throttled at the same time, it is possible to reduce the manufacturing steps and enhance the productivity.

The operation of the communication pipe 188 constructed as set forth above will be described below.

Figure 13:
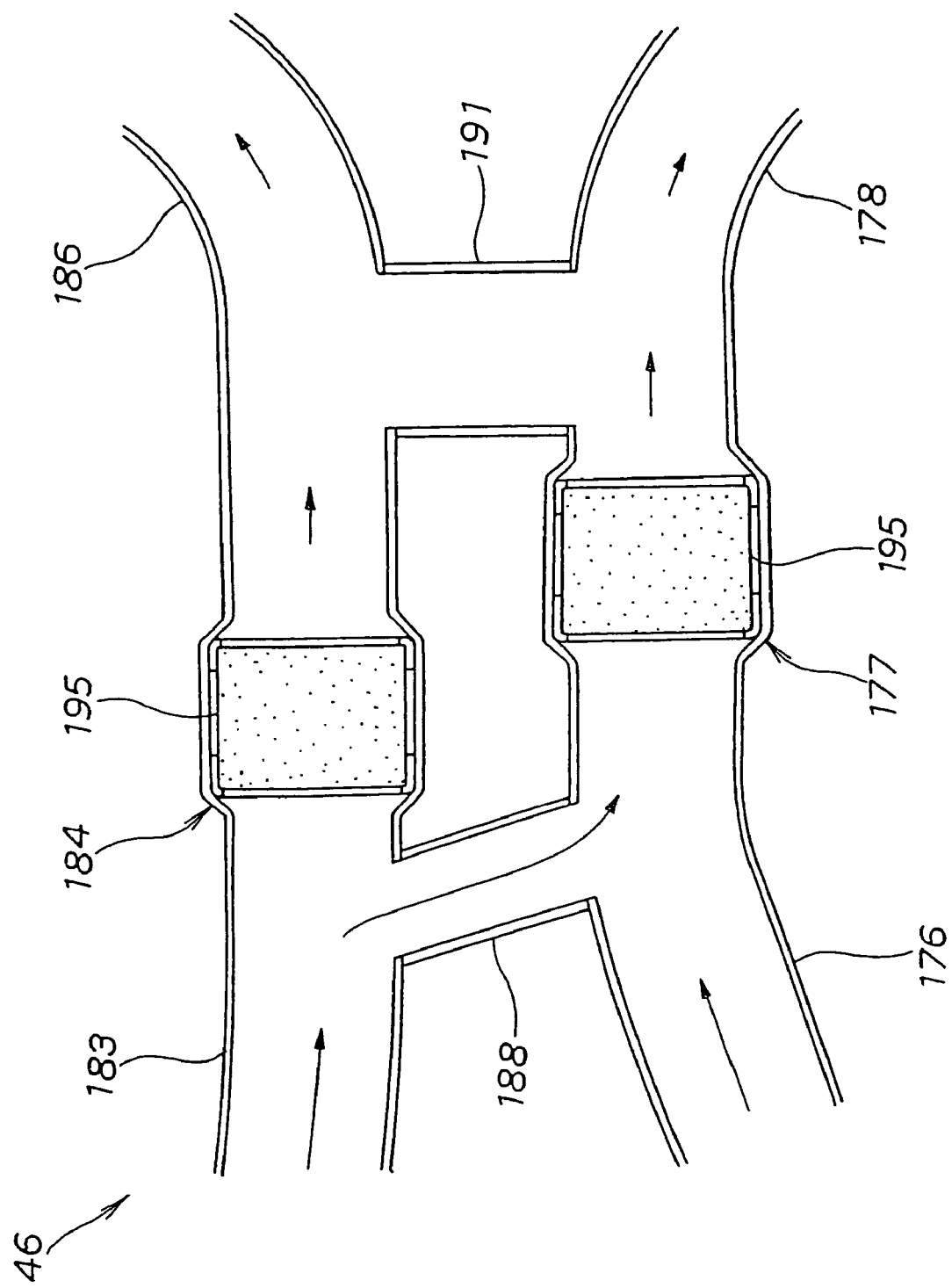
FIG. 13 is an operation diagram showing the operation of a communication pipe used in the motorcycle according to the present invention.

FIG. 13 is an operational diagram showing the operation of a communication pipe used in the motorcycle according to the present invention.

Most of the exhaust gas that flows from the engine into the left confluent pipe 176 usually passes through the catalyst 195 in the left catalyst mounting pipe 177 and flows into the left rear exhaust pipe 178.

Likewise, the exhaust gas that flows from the engine into the right confluent pipe 183 usually passes through the catalyst 195 in the right catalyst mounting pipe 184 and flows into the right rear exhaust pipe 186.

For example, when the catalyst 194 on the right catalyst pipe 184 side is contaminated with carbon and becomes less gas-permeable than the catalyst 194 on the left catalyst 177 side, a portion of the exhaust gas present within the right confluent pipe 183 passes through the communication pipe 188 and reaches the left confluent pipe 176 and thereafter passes through the catalyst 195 in the left catalyst mounting pipe 177 and flows into the left rear exhaust pipe 178.

Conversely, when the catalyst 194 on the left catalyst mounting pipe 177 side is contaminated with carbon and becomes less gas-permeable than the catalyst 195 on the right catalyst mounting pipe 184 side, a portion of the exhaust gas present within the left confluent pipe 176 passes through the communication pipe 188 and reaches the right confluent pipe 183 and thereafter passes through the catalyst 195 in the right catalyst mounting pipe 184 and flows into the right rear exhaust pipe 186.

Thus, in the exhaust device 46, a difference in exhaust pressure between the right and left exhaust pipes wherein the difference is caused by contamination of the catalyst 195 is diminished by the communication pipe 188. Thus, a maximum value of exhaust pressure can be made smaller and it is possible to ensure a desired output characteristic over a long period. Moreover, by installing the communication pipe 188 slantwise between the left and right confluent pipes 176, 183 and by changing the degree of the inclination, it is possible to adjust the length of the communication pipe 188 and improve the output characteristic of the engine.

Figure 14A:
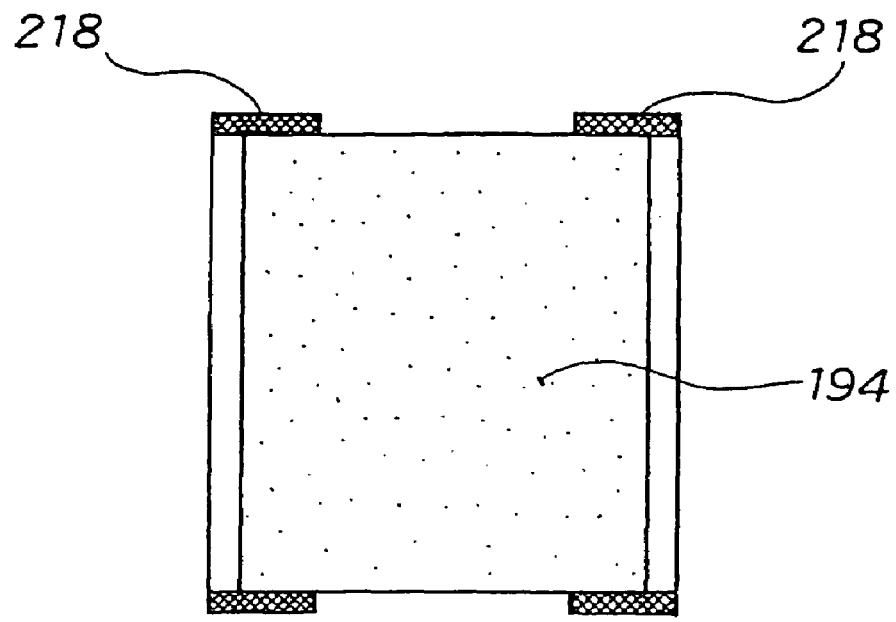
FIGS. 14(a) and 14(b) are sectional views showing a modified example of a catalyst mounting pipe in the motorcycle according to the present invention.

FIGS. 14(a) and (b) are sectional views showing a modified example of a catalyst mounting pipe employable in the motorcycle according to the present invention.

FIG. 14(a) shows a pair of cylindrical spacers 218 fitted on the catalyst 194.

Each of the spacers 218 is formed by weaving a stainless steel wire for elastically holding the catalyst 194.

Figure 14B:
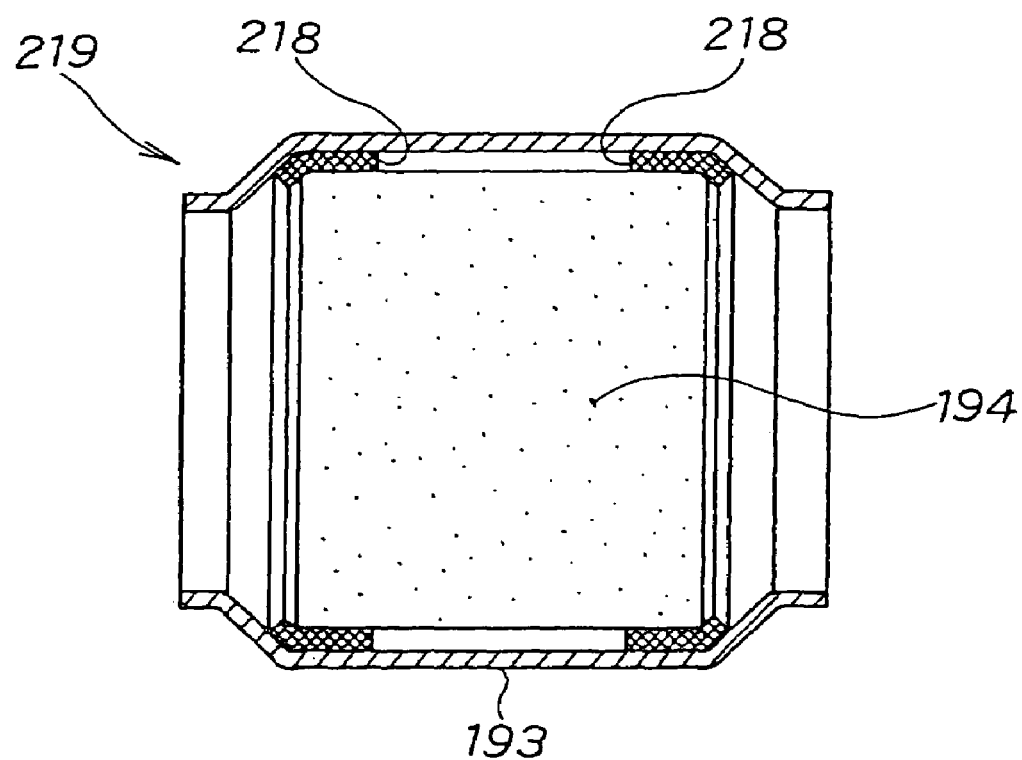

FIG. 14(b) shows a state in which the catalyst 194 and spacers 218 are inserted into the pipe portion and both ends of the pipe portion are throttled to form a catalyst mounting pipe 219.

The spacers 218 which were cylindrical are each bent inwardly at an end portion thereof so as to follow an inner surface of the pipe portion 193 after the throttling for embracingly and elastically holding the corners of the catalyst 194.

Figure 15:
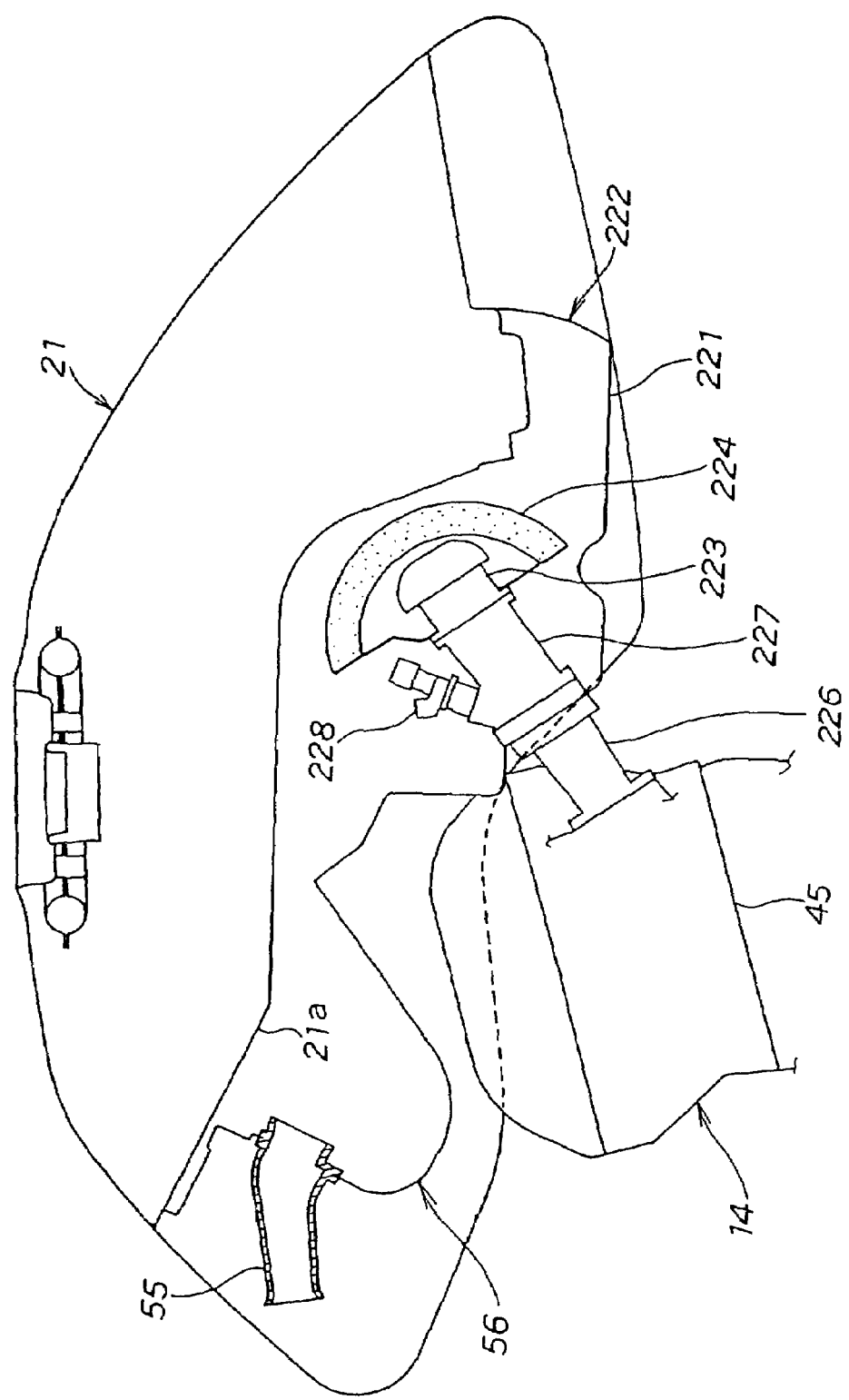
FIG. 15 is a sectional view showing an air cleaner used in the motorcycle according to the present invention.

FIG. 15 is a sectional view showing an air cleaner used in the motorcycle according to the present invention. In the air cleaner 56, an air cleaner case 222 is formed by both a bottom plate 21a of the fuel tank 21 and a case half 221 which is secured to the bottom plate 21a so as to cover the space below the bottom plate 21a. An air funnel 223, disposed within the air cleaner case 222, is covered with a filter 224. An intake port 55 is formed in a front portion of the case half 221.

An intake manifold 226 is attached to the cylinder head 45 of the engine 14. An intake pipe 227 is attached to the intake manifold 226 and serves as a mounting portion for the air funnel 223. A fuel injector 228 is attached to the intake pipe 227.

Thus, by using the bottom plate 21a of the fuel tank 21 as part of the air cleaner case 222, it is possible to effectively utilize the space below the fuel tank 21, so it is possible to constitute the motorcycle 10 (see FIG. 1) in a slim manner and hence it is possible to reduce the weight of the air cleaner case 222.

Figure 16:
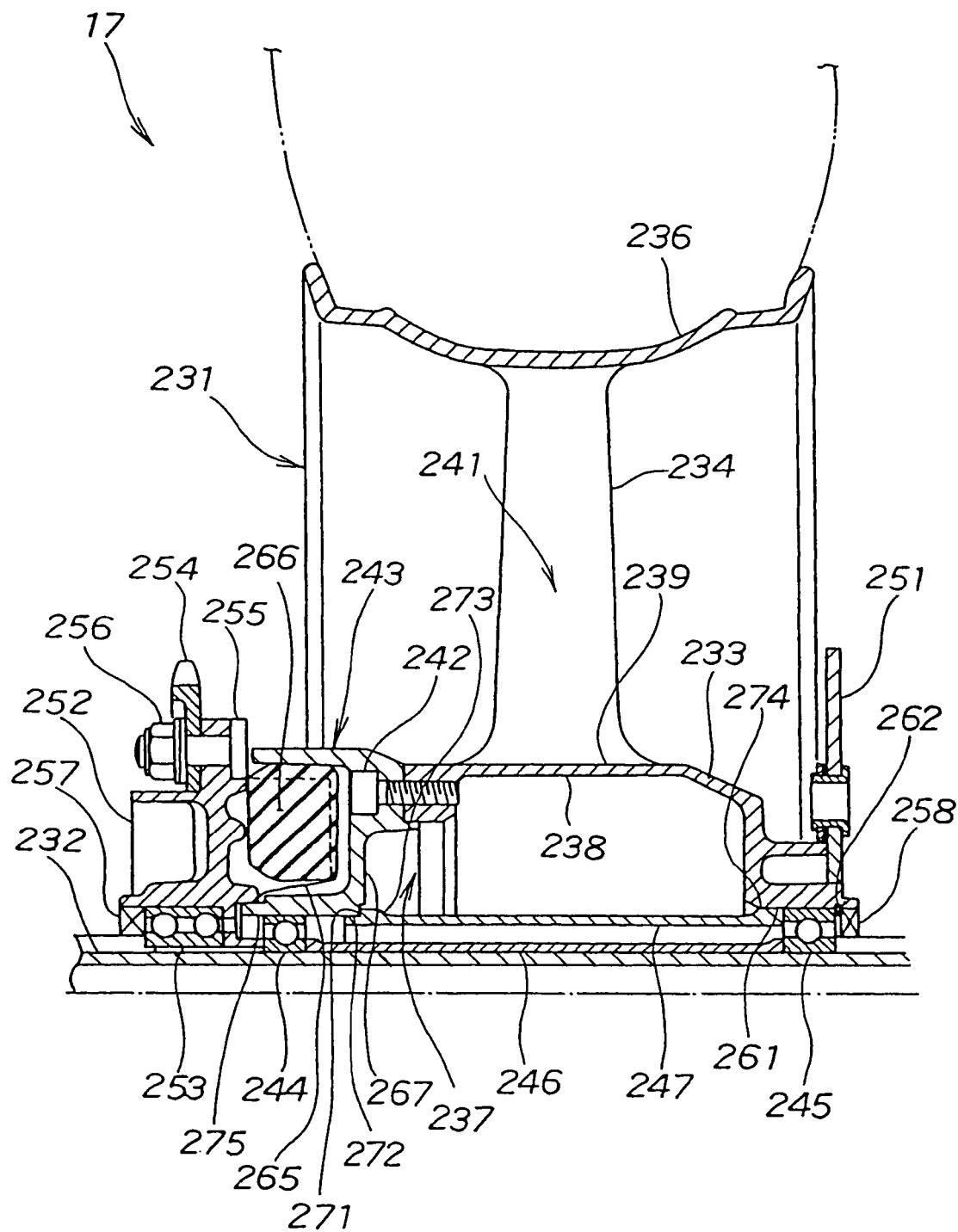
FIG. 16 is a sectional view of a wheel used in the motorcycle according to the present invention.

FIG. 16 is a sectional view of a wheel 231 used in the motorcycle according to the present invention. The description below is directed to a wheel which constitutes the rear wheel 17.

A wheel 231 includes a hub 233 mounted on an axle 232 side, plural spokes 234 extending substantially radially from the hub 233 and a rim 236 provided at distal ends of the spokes 234.

The hub 233 includes a hub body 239 having a concave portion 238 with an opening 237 formed therein. A rubber support member 267 is provided as a side wall member which closes the opening 237. A plurality of bolts 242 are provided for mounting the rubber support member 267 to the hub body 239. An outer collar 247 is disposed within both hub body 239 and rubber support member 267.

The hub body 239, spokes 234 and rim 236 constitute a forged wheel body 241 of an integral structure.

The following description is now provided about the support structure for the wheel 231.

For supporting the wheel 231, the hub 233 includes the hub body 239 and the rubber support member 267 which constitutes a wheel damper 243 that is rotatably mounted on an axle 232 through a left bearing 244 as a second bearing and a right bearing 245 as a first bearing. An inner collar 246 is provided for maintaining a constant distance between the left and right bearings 244, 245. The inner collar 246 is disposed between both bearings 244 and 245 and an outer collar 247 is disposed between the rubber support member 267 and the right bearing 245.

Thus, since the hub body 239 and the outer collar 247 are formed as separate members, in comparison with the conventional integral structure of both hub and outer collar, it is possible to improve the processability by forging of the hub body 239 and the processability for the interior of the concave portion 238, thus permitting an improvement in the productivity.

In FIG. 16, a brake disc 251 is provided for a disc brake system. A sprocket support member 252 is rotatably mounted on the axle 232 through a bearing 253. A driven sprocket 254 is secured to the sprocket support member 252 with a bolt 255 and a nut 256. Dust seals 257 and 258 are provided. A hub body hole 261 is formed in the bottom of the hub 233 for press-fitting therein the right bearing 245 adjacent to the outer collar 247. A retaining ring 262 is provided for preventing dislodgment of the right bearing 245.

When a driving force is transmitted from the engine 14 and transmission 15 shown in FIG. 1 to the wheel 231 via the chain 47 and the driven sprocket 254 shown in FIG. 16, the wheel damper 243 mitigates a shock to prevent the transfer of an excessive shock from the driven sprocket 254 to the wheel 231. The wheel damper 243 includes a plurality of projections 265 formed on the sprocket support member 252, a rubber piece 266 adjacent to the projections 265 and a rubber support member 267 for supporting the rubber piece 266. The driving force is transmitted from the driven sprocket 254→sprocket support member 252→projections 265→rubber piece 266→rubber support member 267→hub body 239.

If a shocking driving force is applied to the driven sprocket 254, the shock is absorbed by the rubber piece 266 which is pushed by the projections 265 and contracts.

A stepped portion 271 is formed at one end of the outer collar 247 for abutment against a corner portion 272 of the rubber support member 267. An opposite end portion 274 of the outer collar 247 is provided for fitting into the hub body hole 261 with a support member hole 275 that is formed as a side wall hole formed in the rubber support member 267 for fitting a tip of the stepped portion 271 of the outer collar 247.

Next, with reference to FIGS. 17 to 19(b), a description will be given below about a method for mounting the wheel 231 constructed as above onto the axle 232.

Figure 17:
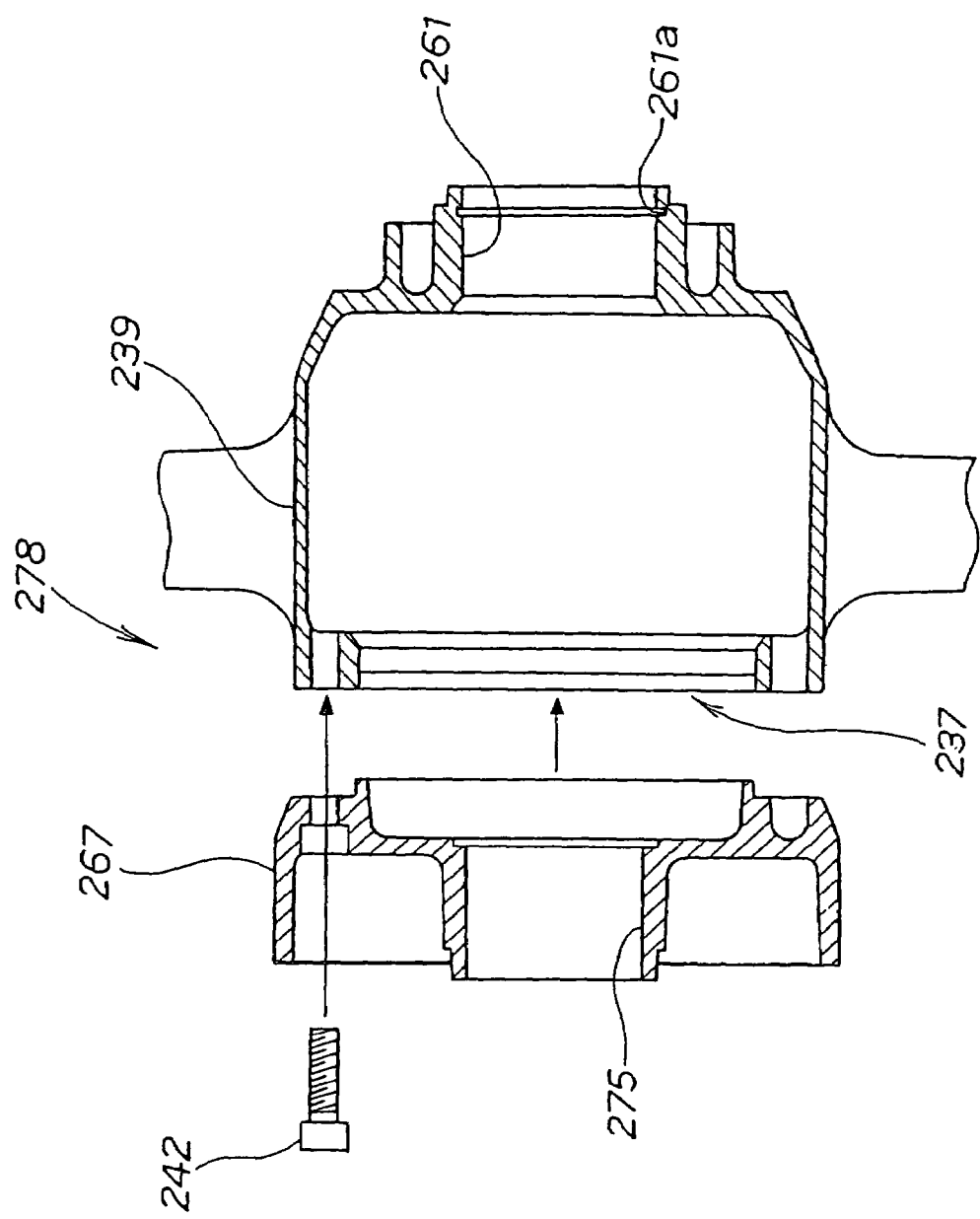
FIG. 17 is a first operation diagram showing how to assemble the wheel according to the present invention.

FIG. 17 is a first operational diagram showing a wheel mounting method according to the present invention.

First, the rubber support member 267 is attached to the opening 237 side of the hub body 239 with bolts 242. As a result, a hub assembly 278 is fabricated from the hub body 239 and the rubber support member 267.

FIGS. 18(a) and 18(b) are second operational diagrams showing a wheel mounting method according to the present invention.

In FIG. 18(a), the outer collar 247 is inserted into the hub assembly 278 through the hub body hole 261 formed in the hub body 239, and the stepped portion 271 of the outer collar 247 is brought into abutment against the corner portions 272 of the rubber support member 267.

In FIG. 18(b), the right bearing 245 is press-fitted into the hub body hole 261 until abutment against the opposite end portion 274 of the outer collar 247.

At this time, the outer collar 247 is in abutment with the rubber support member 267, so that a press-fit load on the right bearing 245 can be borne by the rubber support member 267 through the outer collar 247 and hence it is possible to prevent deformation of the hub 233.

Further, the retaining ring 262 is fitted in an annular groove 261a formed in the hub body hole 261.

FIGS. 19(a) and 19(b) are third operation diagrams showing a wheel mounting method according to the present invention.

In FIG. 19(a), the inner collar 246 is inserted into the outer collar 247 through the support member hole 275 formed in the rubber support member 267 and a front end of the inner collar 246 is brought into abutment against the right bearing 245.

In FIG. 19(b), the left bearing 244 is press-fitted into the support member hole 275 until abutment against the inner collar 246.

In FIG. 16, the sprocket support member 252 with the bearing 253 press-fitted therein in advance and with the driven sprocket 254 mounted thereon is combined with a side portion of the rubber support member 267. The dust seal 257 is fitted in an end portion of the sprocket support member 252 with the dust seal 258 is fitted in an end portion of the hub body 239. The axle 232 is passed through all of the bearing 253, left bearing 244, inner collar 246 and right bearing 245.

The mounting of the wheel 231 onto the axle 232 is now over.

Figure 20:
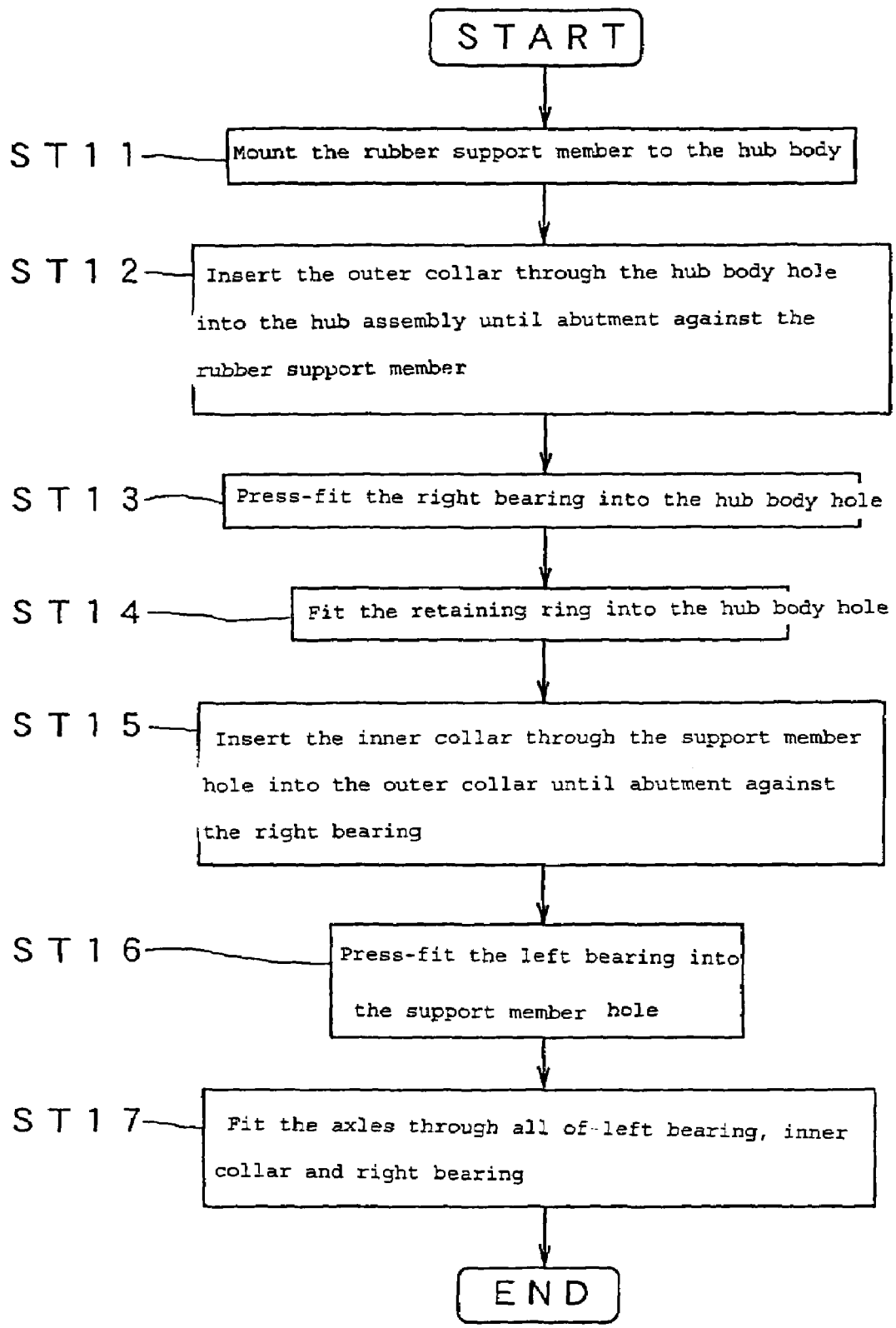
FIG. 20 is a flow chart showing a wheel mounting method according to the present invention.

FIG. 20 a flow chart showing a wheel mounting method according to the present invention. A description will be given again on the basis of the wheel mounting method illustrated in FIGS. 17 to 19(b). STXX represents a step number.

ST11 . . . The rubber support member is secured to the hub body.

ST12 . . . The outer collar is inserted through the hub body hole into the hub assembly until abutment against the rubber support member.

ST13 . . . The right bearing is press-fitted into the hub body hole.

ST14 . . . The retaining ring is fitted into the hub body hole.

ST15 . . . The inner collar is inserted through the support member hole into the outer collar until abutment against the right bearing.

ST16 . . . The left bearing is press-fitted into the support member hole.

ST17 . . . The axle is fitted through all of the left bearing, inner collar and right bearing.

The mounting of the wheel is now over.

Figure 21:
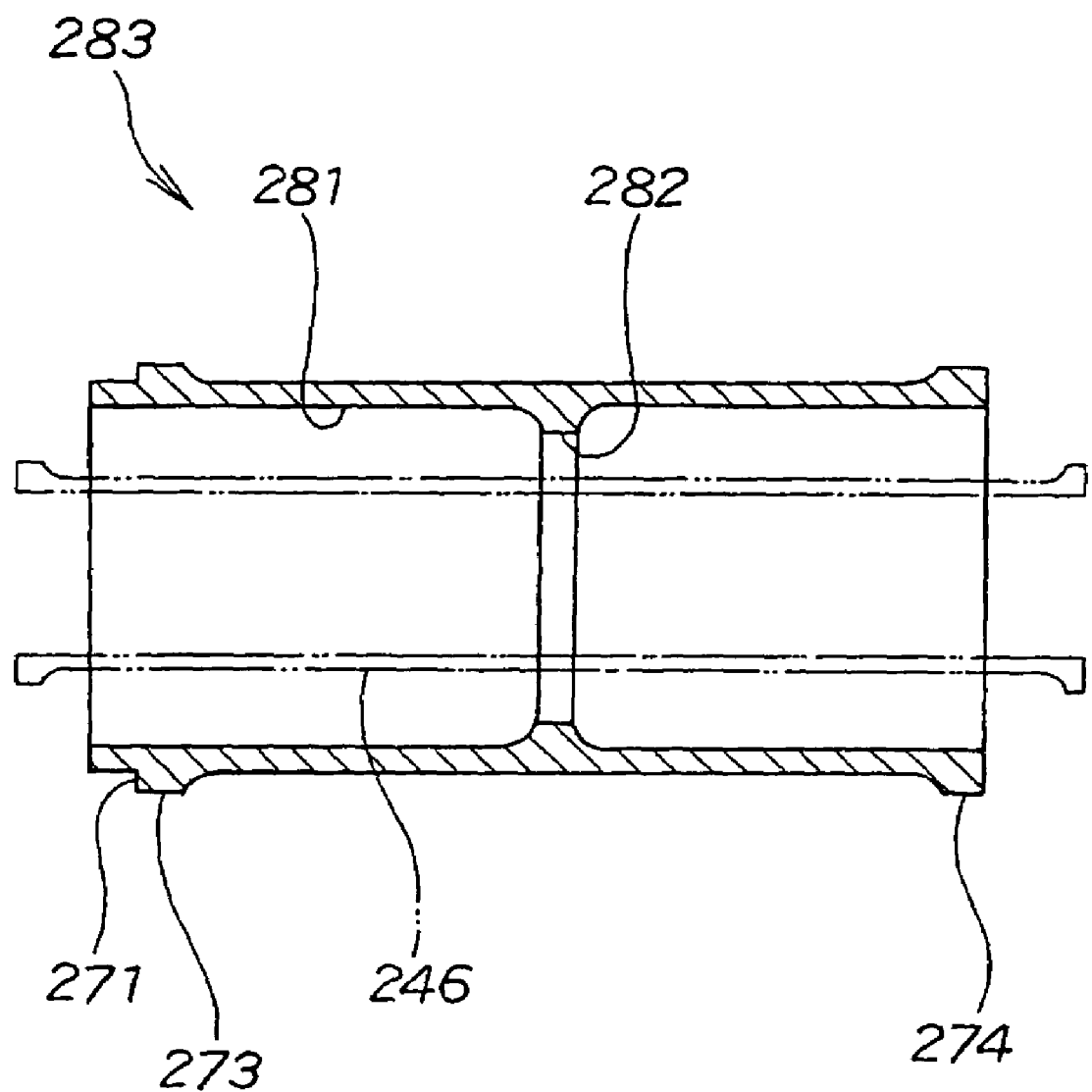
FIG. 21 is a sectional view showing a modified example of an outer collar in the wheel according to the present invention.

FIG. 21 is a sectional view showing a modified example of an outer collar in the wheel according to the present invention. There is illustrated an outer collar 283 provided on an inner surface thereof with an annular protuberance 282.

By thus forming the protuberance 282 on the inner surface of the outer collar 283, the inner collar 246 inserted into the outer collar 283 can be positioned nearly centrally of a cross section of the outer collar 283, so that the axle 232 (see FIG. 16) can be inserted into the inner collar 246 more easily.

Figure 22:
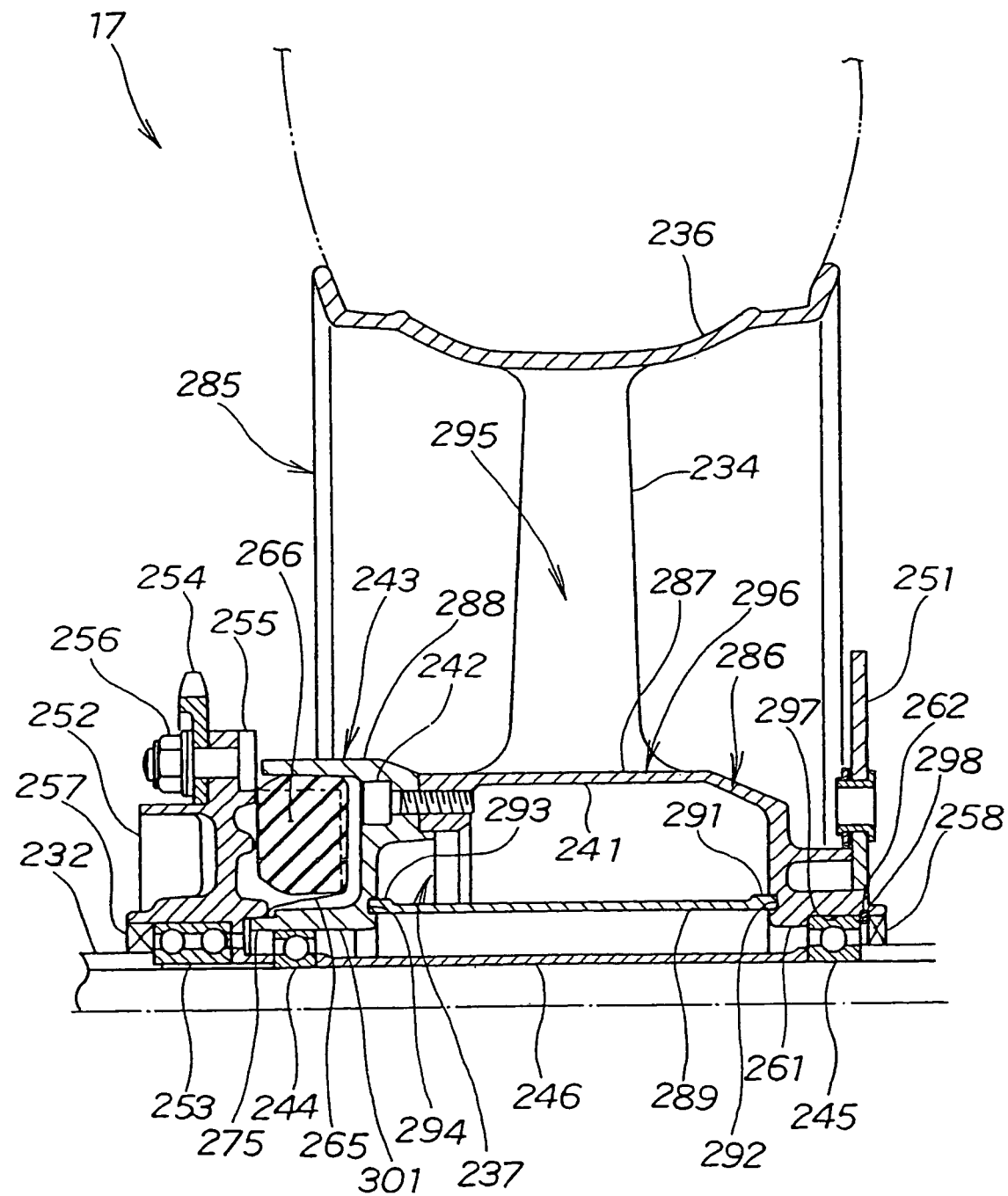
FIG. 22 is a sectional view showing a wheel in the motorcycle according to another embodiment of the present invention.

FIG. 22 is a sectional view showing a wheel according to another embodiment of the present invention, in which the same constructional portions as in the embodiment illustrated in FIG. 16 are identified by the same reference numerals, and detailed explanations thereof will here be omitted.

A wheel 285 is provided with a hub 286 mounted on the axle 232 side.

The hub 286 includes a hub body 287 and a rubber support member 288 as a side wall member which closes an opening 237 formed in the hub body 287. A plurality of bolts 242 are provided for mounting the rubber support member 288 to the hub body 287. An outer collar 289 is disposed within both hub body 287 and rubber support member 288.

The hub body 287 has an annular groove 292 formed in an inner surface thereof for insertion therein of one end portion 291 of the outer collar 289. Likewise, the rubber support member 288 has an annular groove 294 formed in an inner surface thereof for insertion therein of an opposite end 293 of the outer collar 289.

The hub body 287, spokes 234 and rim 236 constitute a forged wheel body 295 of an integral structure.

The following description is now provided about a method for mounting the wheel 285 onto the axle 232.

First, while one end portion 291 of the outer collar 289 is inserted into the annular groove 292 of the hub body 287 and the opposite end portion 293 of the outer collar 289 is inserted into the annular groove 294 of the rubber support member 288, the rubber support member 288 is mounted with bolts 242 to the opening 237 side of the hub body 287. As a result, a hub assembly 296 includes the hub body 287, rubber support member 288 and outer collar 289.

Next, the right bearing 245 is press-fitted into a hub body hole 297 formed in the bottom of the hub body 287. Further, a retaining ring 262 is fitted in an annular groove 298 formed in the hub body hole 297.

Thereafter, an inner collar 246 is inserted into the outer collar 289 through a support member hole 301 which is formed as a side wall hole centrally of the rubber support member 288 and a front end thereof is brought into abutment against a right bearing 245.

Further, a left bearing 244 is press-fitted into the support member hole 301 until abutment against the inner collar 246.

Thereafter, in FIG. 16, the sprocket support member 252 with bearing 253 and driven sprocket 254 attached thereto in advance is combined with a side portion of the rubber support member 288. The dust seal 257 is fitted in an end portion of the sprocket support member 252 with the dust seal 258 being fitted in an end portion of the hub body 287. The axle 232 is inserted through all of the bearing 253, left bearing 244, inner collar 246 and right bearing 245.

The mounting of the wheel 285 onto the axle 232 is now complete.

Figure 23:
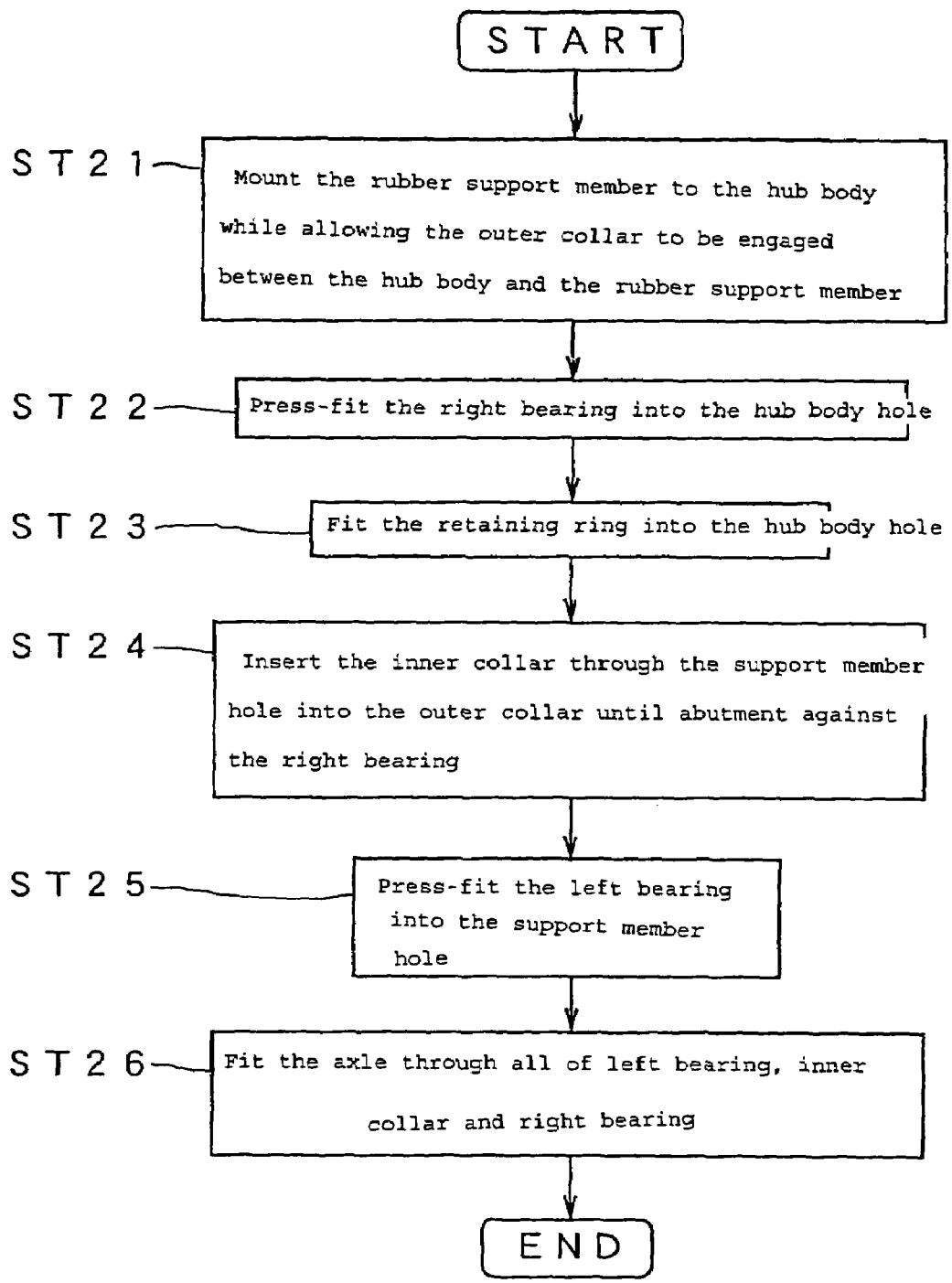
FIG. 23 is a flow chart showing another wheel mounting method according to the present invention.

FIG. 23 is a flow chart showing another wheel mounting method according to the present invention. A description will be given below again on the basis of the wheel mounting method illustrated in FIG. 22. STXX represents a step number.

ST21 . . . The rubber support member is mounted to the hub body while allowing the outer collar to be engaged between the hub body and the rubber support member.

ST22 . . . The right bearing is press-fitted into the hub body hole.

ST23 . . . The retaining ring is fitted in the hub body hole.

ST24 . . . The inner collar is inserted through the support member hole into the outer collar until abutment against the right bearing.

ST25 . . . The left bearing is press-fitted into the support member hole.

ST26 . . . The axle is fitted through all of the left bearing, inner collar and right bearing.

The mounting of the wheel is now over.

Figure 24:
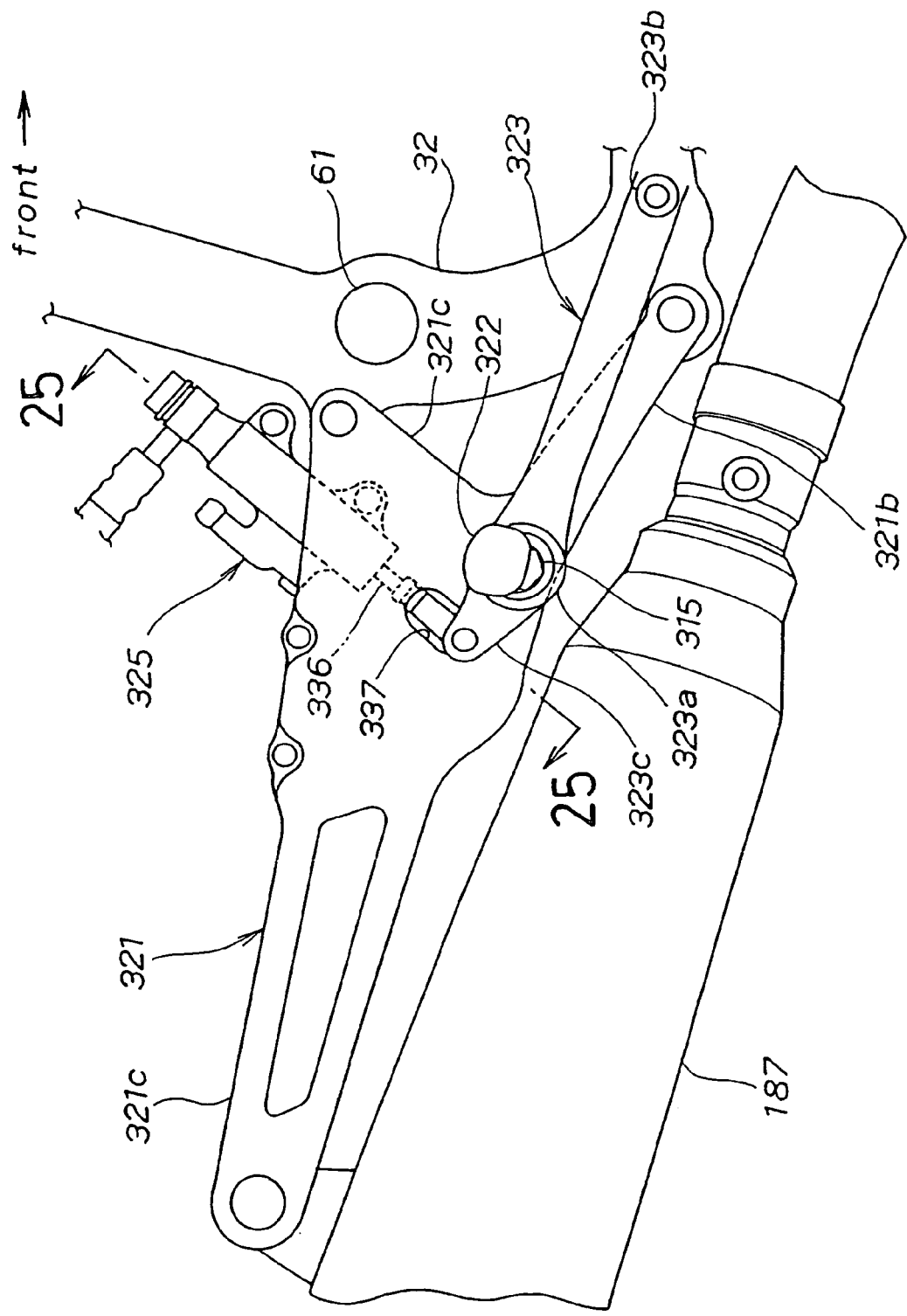
FIG. 24 is a side view showing a step support structure used in the motorcycle according to the present invention.

FIG. 24 is a side view showing a step support structure used in the motorcycle according to the present invention (the arrow "front" indicates the front of the vehicle body). In FIG. 24, a step holder 321 is secured to a rear lower portion of the main frame 32 with a step 322 being secured with a bolt 315 to the step holder 321. A brake pedal 323 is swingably secured to the bolt 315 at a position inside the step 322.

The step holder 321 is provided with an upper arm portion 321a and a lower arm portion 321b for mounting to the main frame 32 and is further provided with a rear extending portion 321c for mounting of the right muffler 187.

The brake pedal 323 includes a base portion 323a secured to the bolt 315 through a bearing, a step-in portion 323b formed at a front end and a cylinder connecting portion 323c formed at a rear end. The cylinder connecting portion 323c is connected to a master cylinder 325.

Figure 25:
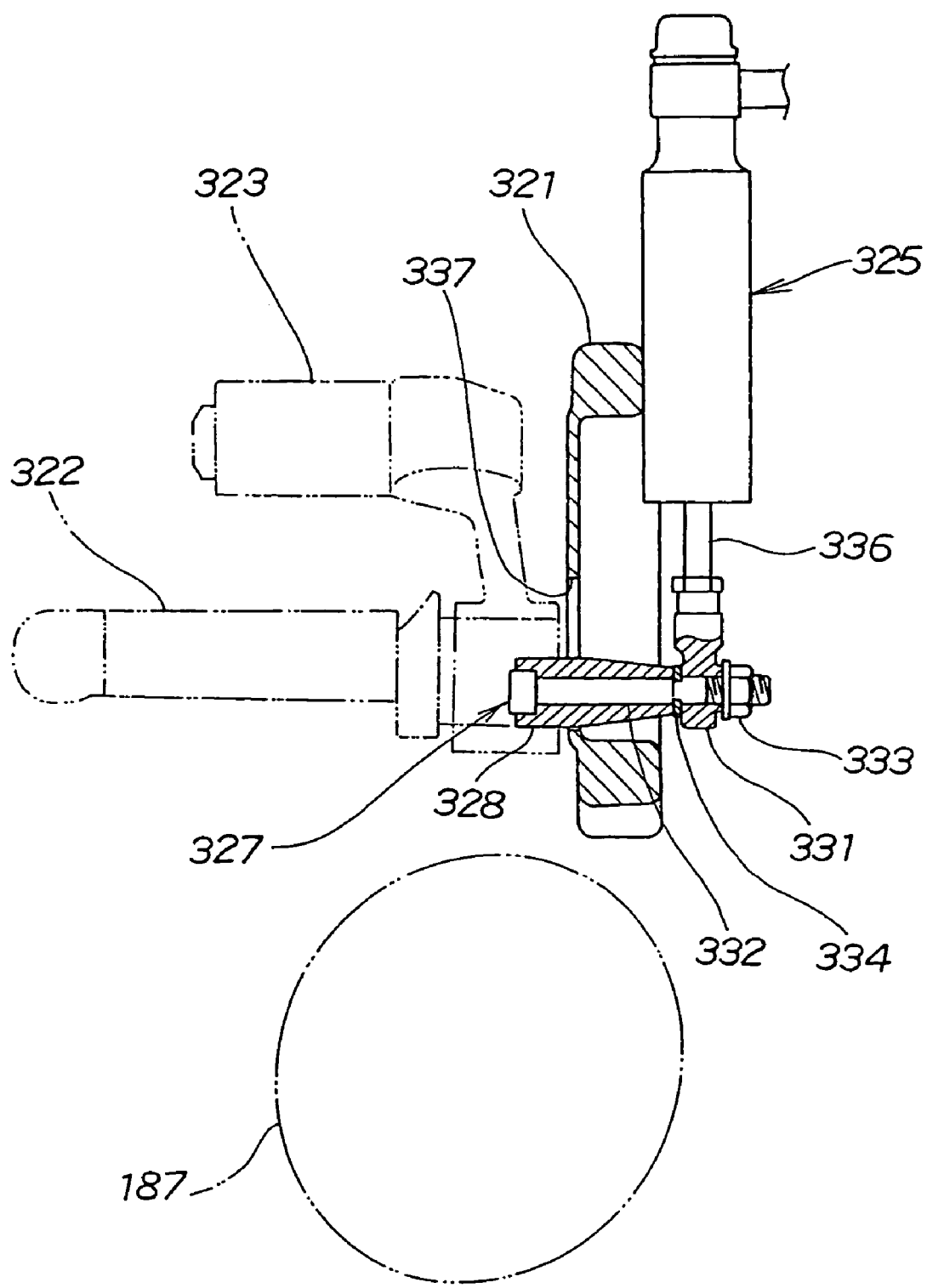
FIG. 25 is a sectional view taken on line 25—25 in FIG. 24.
Figure 26:
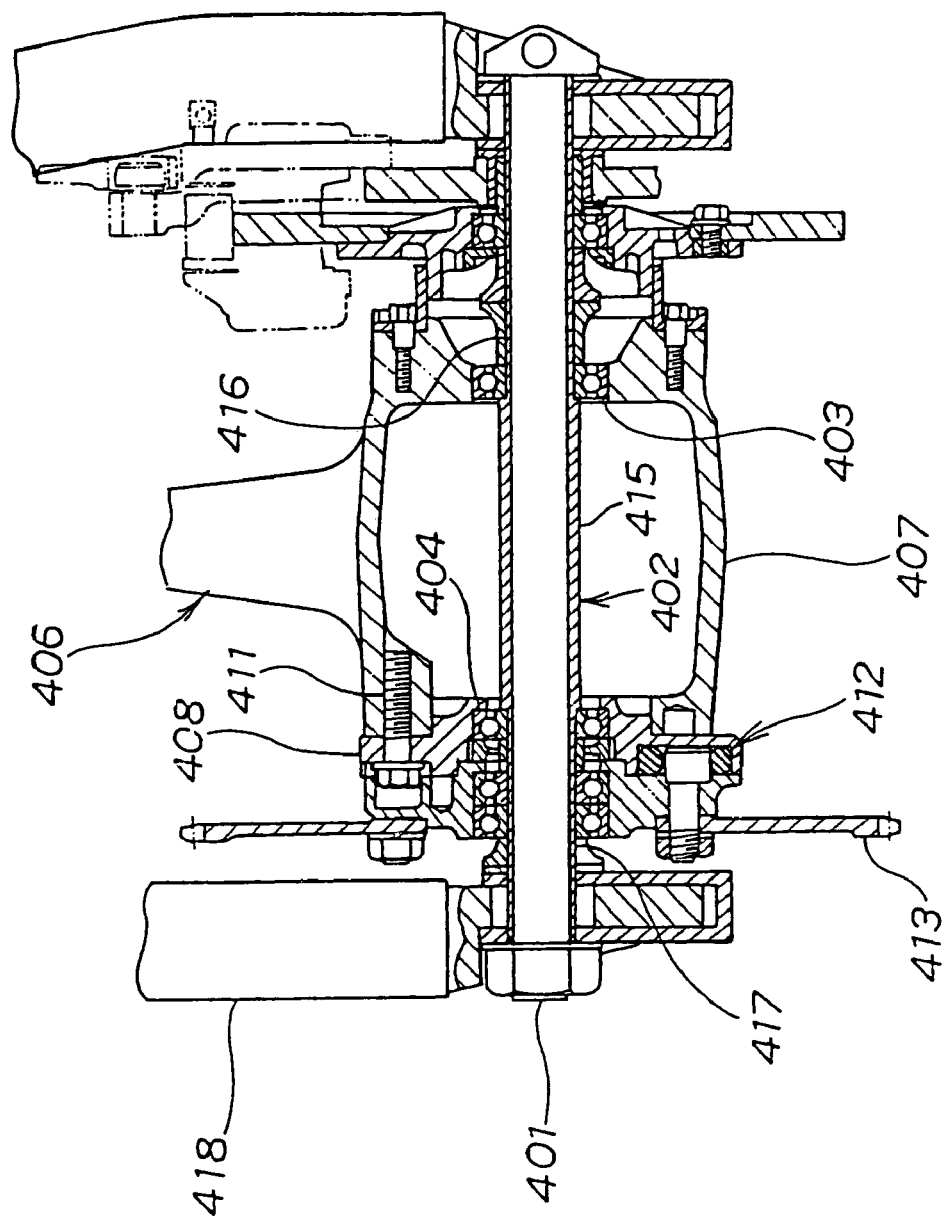
FIG. 26 is a sectional view showing a conventional wheel structure.
Figure 27:
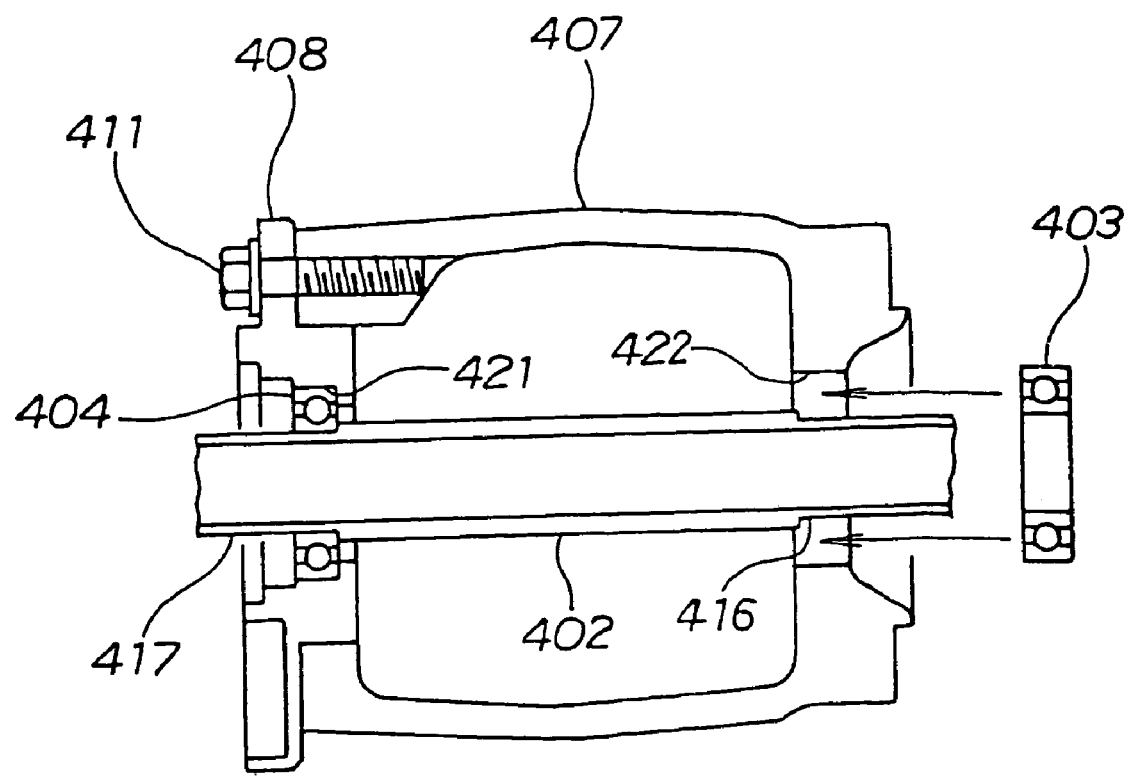
FIG. 27 is an operation diagram showing a conventional wheel mounting method.

FIG. 25 is a sectional view taken on line 25—25 in FIG. 24. In FIG. 25, a connecting member 327 is provided for connecting the master cylinder 325 to the brake pedal 323 and includes an extension member 328 secured to the cylinder connecting portion 323c (see FIG. 24) of the brake pedal 323. A bolt 332 is inserted into both the extension member 328 and a rod tip member 331 of the master cylinder 325. A nut 333 is threadedly engaged with an end portion of the bolt 332. A retaining ring 334 is disposed at an intermediate position of the bolt 332 between the extension member 328 and the rod tip member 331.

The rod tip member 331 is a member attached to a rod 336 which extends from a piston received within the master cylinder 325.

An insertion hole 337 is formed in the step holder 321 for insertion of the connecting member 327 through the step holder 321.

Although in the embodiment illustrated in FIG. 22 the outer collar 289 is in a cylindrical shape which is almost uniform with respect to an outside diameter, this does not constitute any limitation. For example, the outer collar 289 may be a cylindrical shape wherein the outside diameter of a central portion is set large, and the portions located on both sides of the large-diameter portion are set smaller relative to the large-diameter portion. In this case, the smaller-diameter portions are fitted in the hub body hole 261 and the support member hole 301, respectively, and the surfaces orthogonal to the axis, which are formed in the boundaries between the large- and small-diameter portions may be abutted against the hub body 287 and the rubber support member 288, respectively.

Since the present invention is constructed as above, it exhibits the following effects.

In the wheel structure of the present invention, the first bearing is abutted against the side wall member through the cylindrical outer collar which surrounds the inner collar. Thus, when the first bearing is press-fitted into the hub body hole, the press-fit load imposed on the first bearing can be borne by the side wall member through the outer collar. Therefore, in the present invention, it is possible to enhance the rigidity of the hub and suppress the deformation of the hub body in comparison with the conventional wheel structure not provided with the outer collar and wherein most of the press-fit load on bearing is borne by the hub.

Moreover, since the first bearing and the side wall member are connected together by the outer collar, the hub body and the side wall member are connected together at a position close to the axle, so that it is possible to enhance the rigidity of the hub. Consequently, it is possible to bear a higher load which is imposed on the hub during vehicular operation.

In the wheel structure according to the present invention, the cylindrical outer collar which surrounds the inner collar is connected bridgewise between the hub body and the side wall member, so when the first or the second bearing is press-fitted into one of the hub body and the side wall member, the press-fit load imposed on the first or the second bearing can be borne by the other hub body and the side wall member through the outer collar. Consequently, it is possible to enhance the rigidity of the hub and suppress the deformation of the hub body or the side wall member at the time of press-fitting of the first or the second bearing. Further, it is possible to bear a higher load acting on the hub during vehicular operation.

According to the wheel mounting method of the present invention, the side wall member is combined with the hub body with the cylindrical outer collar is inserted into the hub body through the hub body hole formed in the bottom of the hub body. The front end of the outer collar is brought into abutment against the side wall member with the first bearing being fitted into the hub body hole. The cylindrical inner collar is inserted into the outer collar through the side wall hole formed centrally of the side wall member with the front end of the inner collar being brought into abutment against the first bearing. The second bearing is fitted into the side wall hole and is brought into abutment against the inner collar. The axle is fitted through all of the second bearing, inner collar and first bearing. Therefore, the outer collar can be easily mounted into the hub by insertion thereof into the hub body through the hub body hole, and the hub can be reinforced easily by the outer collar.

According to the wheel mounting method of the present invention, the hub body and the side wall member are combined together while holding the cylindrical outer collar between the hub body and the side wall member. The first bearing is fitted into the hub body hole formed in the bottom of the hub body with the cylindrical inner collar being inserted into the outer collar through the side wall hole formed centrally of the side wall member. The front end of the inner collar is brought into abutment against the first bearing with the second bearing being fitted into the side wall hole being brought into abutment against the inner collar. The axle is fitted through all of the second bearing, inner collar and first bearing. Thus, the outer collar for reinforcing the hub can be mounted into the hub at the time of combining the hub body with the side wall member. Thus, an increase in the number of steps is prevented. Consequently, it is possible to prevent an increase of cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel structure comprising:
   a cup-like hub body;
   a side wall member for closing an opening formed in said hub body;
   a first bearing disposed on a hub body side of said wheel and a second bearing disposed on a side wall member side of said wheel for rotatably mounting said hub relative to an axle;
   a cylindrical inner collar fitted on said axle for keeping said first and said second bearing spaced from each other; and
   a cylindrical outer collar for spacing said first bearing from said side wall member, said cylindrical outer collar being positioned to surround said inner collar.

2. The wheel structure according to claim 1, and further including a wheel damper operatively positioned between a driven sprocket and a support member.

3. The wheel structure according to claim 2, wherein said wheel damper includes a rubber member and a plurality of projections are disposed on said support member for selectively engaging said rubber member for mitigating a shock being transferred from the driven sprocket to the wheel.

4. The wheel structure according to claim 2, wherein said cylindrical outer collar includes a stepped portion for engagement with said support member.

5. The wheel structure according to claim 2, and further including a bearing for rotatably mounting the driven sprocket relative to the axle.

6. The wheel structure according to claim 2, and further including a dust seal for operatively sealing said first and second bearing relative to ambient conditions.

7. A wheel structure comprising:
   a hub including both a cup-like hub body and a side wall member for closing an opening formed in said hub body;
   a first bearing disposed on a hub body side of said wheel and a second bearing disposed on a side wall member side of said wheel for rotatably mounting said hub to an axle;
   a cylindrical inner collar fitted on said axle for maintaining said first and said second bearings spaced from each other;
   a cylindrical outer collar for surrounding said inner collar, said cylindrical outer collar is connected to both said hub body and said side wall member.

8. The wheel structure according to claim 7, and further including a wheel damper operatively positioned between a driven sprocket and a support member.

9. The wheel structure according to claim 8, wherein said wheel damper includes a rubber member and a plurality of projections are disposed on said support member for selectively engaging said rubber member for mitigating a shock being transferred from the driven sprocket to the wheel.

10. The wheel structure according to claim 8, wherein said cylindrical outer collar includes a stepped portion for engagement with said support member.

11. The wheel structure according to claim 8, and further including a bearing for rotatably mounting the driven sprocket relative to the axle.

12. The wheel structure according to claim 8, and further including a dust seal for operatively sealing said first and second bearing relative to ambient conditions.

13. A method for mounting a wheel to an axle, said wheel having a hub which comprises a generally cup-like hub body and a side wall member for closing an opening formed in said hub body, said method comprising the following steps:
   connecting said side wall member to said hub body;
   inserting a cylindrical outer collar into said hub body through a hub body hole formed in a bottom of the hub body and abutting a tip of said outer collar against said side wall member;
   fitting a first bearing into said hub body hole;
   inserting a cylindrical inner collar into said outer collar through a side wall hole formed centrally of said side wall member and abutting a tip of said inner collar against said first bearing;
   fitting a second bearing into said side wall hole and abutting said second bearing against said inner collar; and
   disposing the axle so as to be fitted within said second bearing, said inner collar and said first bearing.

14. A method for mounting a wheel to an axle, said wheel having a hub which comprises a generally cup-like hub body and a side wall member for closing an opening formed in said hub body, said method comprising the following steps:

connecting said hub body and said side wall member with each other while holding a cylindrical outer collar between the hub body and the side wall member;

fitting a first bearing into a hub body hole formed in a bottom of said hub body;

inserting a cylindrical inner collar into said outer collar through a side wall hole formed centrally of said side wall member and abutting a tip of said inner collar against a first bearing;

fitting a second bearing into said side wall hole and abutting said second bearing against said inner collar; and disposing the axle so as to be fitted within said second bearing, said inner collar and said first bearing.

* * * * *